(12) United States Patent
Xu et al.

(10) Patent No.: US 12,495,334 B2
(45) Date of Patent: Dec. 9, 2025

(54) SESSION SETUP AND HANDOVER METHOD AND DEVICE THEREOF

(71) Applicant: Samsung Electronics Co., Ltd., Suwon-si (KR)

(72) Inventors: Lixiang Xu, Beijing (CN); Lisi Li, Beijing (CN); Weiwei Wang, Beijing (CN); Hong Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 394 days.

(21) Appl. No.: 17/759,283

(22) PCT Filed: Jan. 12, 2021

(86) PCT No.: PCT/KR2021/000394
§ 371 (c)(1),
(2) Date: Jul. 21, 2022

(87) PCT Pub. No.: WO2021/149958
PCT Pub. Date: Jul. 29, 2021

(65) Prior Publication Data
US 2023/0040440 A1 Feb. 9, 2023

(30) Foreign Application Priority Data

Jan. 22, 2020 (CN) .......................... 202010075502.6
Apr. 7, 2020 (CN) .......................... 202010266652.5

(51) Int. Cl.
*H04W 4/40* (2018.01)
*H04W 28/26* (2009.01)
(Continued)

(52) U.S. Cl.
CPC ........ *H04W 28/26* (2013.01); *H04W 36/0011* (2013.01); *H04W 76/10* (2018.02); *H04W 80/10* (2013.01)

(58) Field of Classification Search
CPC . H04W 28/26; H04W 36/0011; H04W 76/10; H04W 80/10; H04W 36/22;
(Continued)

(56) References Cited

U.S. PATENT DOCUMENTS

2020/0229059 A1 7/2020 Xu et al.
2021/0076318 A1 3/2021 Zong et al.
2022/0345887 A1* 10/2022 Karampatsis ........... H04W 8/18

FOREIGN PATENT DOCUMENTS

CN 109219111 A 1/2019
CN 109392043 A 2/2019
(Continued)

OTHER PUBLICATIONS

Supplementary European Search Report dated May 23, 2023, in connection with European Application No. 21743763.1, 10 pages.
(Continued)

*Primary Examiner* — Tanmay K Shah

(57) ABSTRACT

A method and a device for session setup and handover in a wireless communication system are provided. The method comprises receiving, from a second node, a message comprising a single network slice selection assistance information (S-NSSAI) of a protocol data unit (PDU) session; and allocating session resources for the PDU session based on the message received from the second node, wherein, in case that the S-NSSAI of the PDU session is supported by the first node, the session resources for the PDU session includes resources related to the S-NSSAI of the PDU session, and wherein, in case that the S-NSSAI of the PDU session is unsupported by the first node or the resources related to the S-NSSAI are unavailable or overloaded, the session resources for the PDU session includes other available resources for the PDU session.

19 Claims, 13 Drawing Sheets

(51) Int. Cl.
*H04W 36/00* (2009.01)
*H04W 76/10* (2018.01)
*H04W 80/10* (2009.01)

(58) Field of Classification Search
CPC ............... H04W 72/543; H04W 76/12; H04W 36/0033; H04W 36/0005; H04W 76/27; H04W 36/38; H04W 48/18
USPC ...................................................... 455/422.1
See application file for complete search history.

(56) References Cited

FOREIGN PATENT DOCUMENTS

| CN | 110519806 A | 11/2019 |
|---|---|---|
| EP | 3576458 A1 | 12/2019 |
| EP | 3595358 A1 | 1/2020 |
| WO | 2018134483 A1 | 7/2018 |
| WO | 2018142200 A1 | 8/2018 |
| WO | 2019001204 A1 | 1/2019 |
| WO | 2019078964 A1 | 4/2019 |
| WO | 2019159567 A1 | 8/2019 |

OTHER PUBLICATIONS

International Search Report and Written Opinion of the International Searching Authority dated Apr. 20, 2021, in connection with International Application No. PCT/KR2021/000394, 6 pages.
3GPP TR 23.740 V16.0.0 (Dec. 2018), Technical Report, 3rd Generation Partnership Project; Technical Specification Group Services and System Aspects; Study on Enhancement of Network Slicing (Release 16), Dec. 2018, 70 pages.
3GPP TS 23.502 V16.3.0 (Dec. 2019), Technical Specification, 3rd Generation Partnership Project; Technical Specification Group Services and System Aspects; Procedures for the 5G System (5GS); Stage 2 (Release 16), Dec. 2019, 547 pages.
Perez-Romero et al., "Optimization of Multitenant Radio Admission Control Through a Semi-Markov Decision Process," IEEE Transactions on Vehicular Technology, vol. 69, Issue 1, Jan. 2020, 15 pages.
First Office Action dated Sep. 14, 2024, in connection with Chinese Application No. 202010266652.5, 16 pages.
Catt, "Discussion on Slice mobility issue," R3-174389, 3GPP TSG-RAN WG3 #98, Reno, NV, USA, Nov. 27-Dec. 1, 20127, 5 pages.
Nokia, et al., "(TP for NR BL CR for TS 38.413): Correction of Handover Resource Allocation," R3-185384, 3GPP TSG-RAN WG3 #101bis, Chengdu, China, Oct. 8-12, 2018, 6 pages.
Registration Procedure Notice issued Mar. 31, 2025, in connection with Chinese Patent Application No. 202010266652.5, 8 pages.
Ericsson, "Application Error "S-Nssai_Congestion"," C4-191104, 3GPP TSG-CT WG4 Meeting #90, Xian, P.R. China; Apr. 8-12, 2019, 8 pages.
Notice of Reasons for Refusal issued Nov. 22, 2024, in connection with Japanese Patent Application No. 2022-544825, 10 pages.
Qualcomm Incorporated et al., "TS 23.501: network selection of slices requested by UE for prioritization and co-existence," S2-174443, SA SA WG2 Meeting #S2-122, San Jose Del Cabo, Mexico, Jun. 26-30, 2017, 10 pages.
Extended European Search Report dated Sep. 2, 2025, in connection with European Application No. 25173319.2, 6 pages.
"3rd Generation Partnership Project; Technical Specification Group Services and System Aspects; System architecture for the 5G System (5GS); Stage 2; (Release 17)", 3GPP TS 23.501, V17.0.0, Mar. 2021, 482 pages.

\* cited by examiner

SESSION SETUP AND HANDOVER METHOD AND DEVICE THEREOF

CROSS-REFERENCE TO RELATED APPLICATIONS

This application is a National Phase Entry of PCT International Application No. PCT/KR2021/000394, which was filed on Jan. 12, 2021, and claims priority to Chinese Patent Application No. 202010075502.6 filed on Jan. 22, 2020, and Chinese Patent Application No. 202010266652.5 filed on Apr. 7, 2020, in the Chinese Intellectual Property Office, the content of each of which are incorporated herein by reference.

BACKGROUND

1. Field

The disclosure relates to a method and a device for session setup and handover in a wireless communication system.

2. Description of Related Art

In order to meet an increasing demand for wireless data communication services since a deployment of 4G communication system, efforts have been made to develop an improved 5G or pre-5G communication system. Therefore, the 5G or pre-5G communication system is also called "beyond 4G network" or "post LTE system".

Wireless communication is one of the most successful innovations in modern history. Recently, the number of subscribers of wireless communication services has exceeded 5 billion, and it continues growing rapidly. With the increasing popularity of smart phones and other mobile data devices (such as tablet computers, notebook computers, netbooks, e-book readers and machine-type devices) in consumers and enterprises, the demand for wireless data traffic is growing rapidly. In order to meet the rapid growth of mobile data traffic and support new applications and deployments, it is critical to improve the efficiency and coverage of wireless interfaces.

The disclosure provides an improved session setup method, a session handover method and device thereof aiming at the problem of service interruption caused by a session handover failure when a user equipment (UE) moves or hands over between different base stations or the problem of a session setup failure in a process of session setup.

The above information is presented as background information only to help understand the present disclosure. No determination is made and no judgment is made as to whether any of the above information is applicable to this disclosure as prior art

SUMMARY

The present disclosure provides a method for session setup and session handover and method thereof in a wireless communication system.

According to an aspect of the present application, a method and an apparatus for session setup and handover in a wireless communication system is provided. The method comprises: receiving, by the first node, a message from a second node, the message comprising a single network slice selection assistance resource (S-NSSAI) of a protocol data unit (PDU) session; and allocating, by the first node, the resources for the PDU session based on the message received from the second node, wherein, when the first node supports the S-NSSAI of the PDU session, it allocates resources of the S-NSSAI of the PDU session for the PDU session, while when the first node does not support the S-NSSAI or the resources of the S-NSSAI are unavailable or overloaded, the first node allocates other available resources for the PDU session.

According to another aspect of the present application, there is provided a base station in a wireless communication system, comprising: a transceiver configured to receive or transmit signals; and at least one processor configured to receive a message from a second node, the message comprising a single network slice selection assistance information (S-NSSAI) of a PDU session; and allocate the resources for the PDU session based on the message received from the second node, wherein, when the base station supports the S-NSSAI of the PDU session, it allocates resources of the S-NSSAI of the PDU session for the PDU session, while when the base station does not support the S-NSSAI or the resources of the S-NSSAI are unavailable or overloaded, the base station allocates other available resources for the PDU session.

According to another aspect of the present application, there is provided a core network node in a wireless communication system, comprising: a transceiver configured to receive or transmit signals; and at least one processor configured to receive a message from a second node, the message comprising an initially allocated single network slice selection assistance information (S-NSSAI) of a PDU session; and allocate the resources for the PDU session based at least in part on the message received from the second node, wherein, when the core network node supports the S-NSSAI of the PDU session, it allocates network slice resources of the S-NSSAI of the PDU session for the PDU session, while when the core network node does not support the S-NSSAI or the network slice resources of the S-NSSAI are unavailable or overloaded, the core network node allocates other available network slice resources for the PDU session.

The disclosure provides the improved method and device for session setup, session handover. It can avoid or reduce the problem of service interruption caused by a session handover failure when a user equipment (UE) moves or hands over between different base stations or the problem of a session setup failure in a process of session setup. At the same time, during UE's movement and handover or of the session setup, the network can always preferentially configure an ongoing session to the most suitable resources. When the most suitable resources are unavailable, it can do its best to serve the UE.

DETAILED DESCRIPTION

Figure 1:
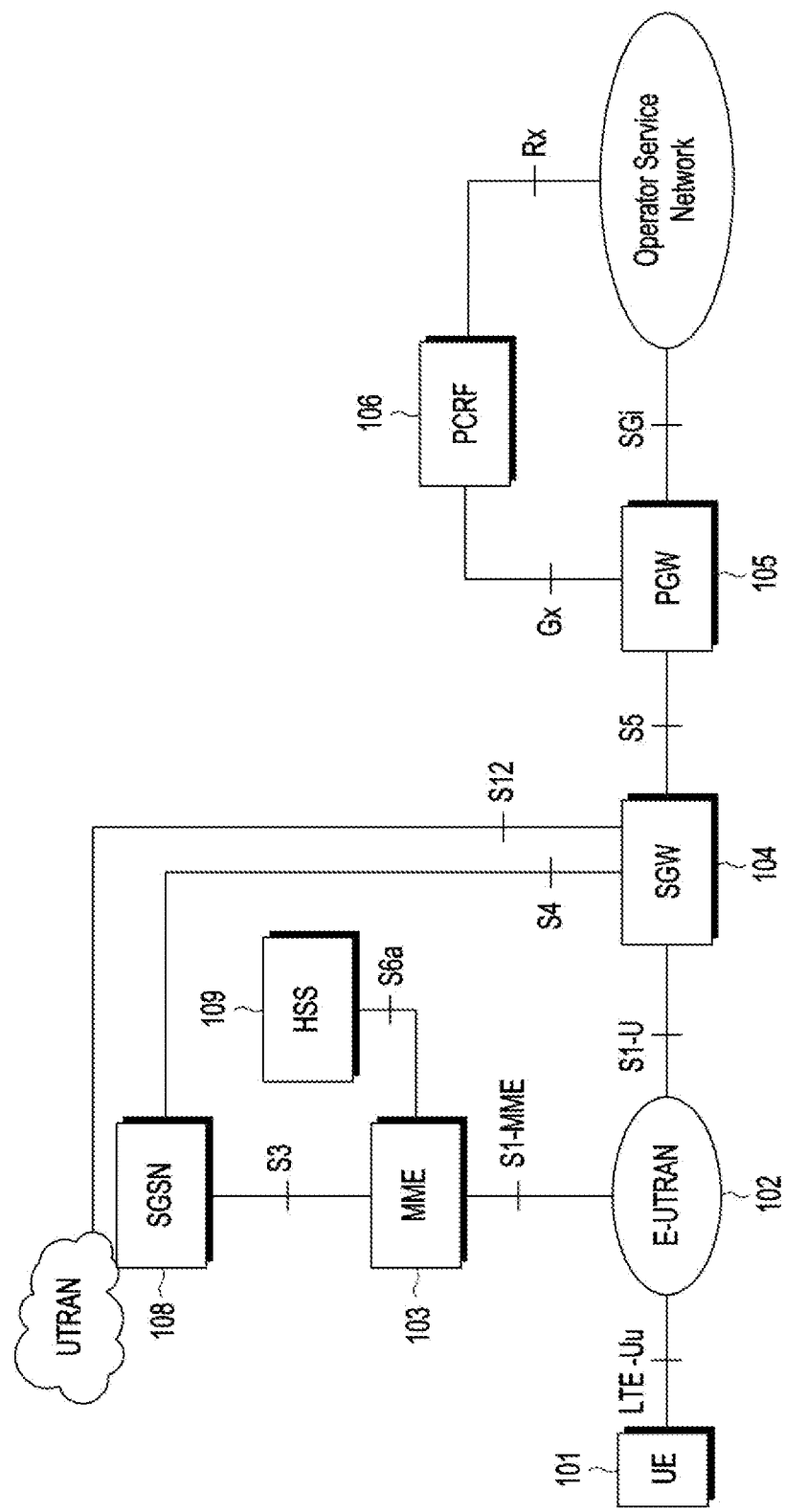
FIG. 1 illustrates a system architecture diagram of system architecture evolution (SAE) according to an embodiment of the present disclosure.

The following description with reference to the accompanying drawings is provided to help fully understanding various embodiments of the disclosure as defined by the claims and their equivalents. It includes various specific details to aid understanding, but these details are to be regarded as exemplary only. Therefore, those of ordinary skill in the art will recognize that various changes and modifications can be made to the various embodiments described herein without departing from the scope of this disclosure. In addition, descriptions of well-known functions and configurations may be omitted for clarity and conciseness.

The terms and expressions used in the following description and claims are not limited to the bibliographical sense, but are only used by the inventors to enable a clear and consistent understanding of the present disclosure. Therefore, it should be apparent to those skilled in the art that the following description of various embodiments of the disclosure is provided for illustrative purposes only, and not for the purpose of limiting the disclosure as defined by the appended claims and their equivalents.

The terms "first", "second", etc., can be used to describe various components, but the components are not limited by the terms. The terms are only used to distinguish one component from other components.

The terms used in this disclosure are only used to describe example embodiments, but are not intended to limit the scope of this disclosure. The singular expression also includes the plural as long as it does not conflict with the context. In this disclosure, the terms "including" and "comprising" indicate the presence of features, quantities, steps, operations, components, elements or combinations thereof recited in this disclosure, but do not exclude the possibility of the presence or addition of one or more other features, quantities, steps, operations, components, elements or combinations thereof.

In this case, it can be understood that each block of processing flowcharts and the combination of the flowcharts can be implemented by computer program instructions. Because these computer program instructions can be installed in the processor of a general purpose computer, a special purpose computer or other programmable data processing apparatus, these instructions for execution by the processor of the computer or other programmable data processing apparatuses create means for implementing the functions described in the block(s) of the flowcharts. Because these computer program instructions may also be stored in a computer-usable or computer-readable memory of the computer or other programmable data processing apparatuses to implement functions in a specific scheme, the computer program instructions stored in the computer-usable or computer-readable memory may also generate an article of manufacture including instruction means for performing functions described in the block(s) of the flowcharts. Because the computer program instructions can also be installed on the computer or other programmable data processing apparatuses, the instructions for performing a series of operation steps on the computer or other programmable data processing apparatuses to create a computer-executed process to run the computer or other programmable data processing apparatuses can also provide steps for implementing the functions described in the block(s) of the flowcharts.

In addition, some of modules, fragments, or codes represented by each block include one or more executable instructions for performing particular logical function(s). In addition, it should be noted that in some alternative embodiments, the functions provided in the blocks may occur regardless of the order. For example, two blocks shown in succession may actually be executed at the same time, or sometimes in the opposite order depending on corresponding functions.

The example embodiments described herein are not meant to be limiting. Matters defined in the description, for example, detailed construction and elements, are only specific details provided to help those of ordinary skill in the art fully to understand this disclosure. The aspects of the disclosure as generally described herein and shown in the figures may be arranged, replaced, combined, separated and designed in various different configurations, all of which are contemplated herein. In addition, unless the context dictates otherwise, the features shown in each figure can be used in combination with each other. Therefore, the figures should generally be regarded as composite parts of one or more general embodiments, but it should be understood that not all illustrated features are necessary for each embodiment.

According to circumstances, the expression "configured" as used in various embodiments of the present disclosure may be used interchangeably with, for example, "adapted to", "capable of", "designed to", "adapted to", "enabled", or "capable of" in terms of hardware or software. Alternatively, in some cases, the expression "a device configured to" may mean that the device is "capable" together with other devices or components. For example, the phrase "a processor is adapted (or configured) to perform A, B, and C" may mean a special-purpose processor (e.g., an embedded processor) that only performs corresponding operations, or a general-purpose processor (e.g., a central processing unit (CPU) or an application processor (AP)) that can perform corresponding operations by running one or more software programs stored in a memory device.

It should be noted that there are three kinds of S-NSSAIs involved in the present disclosure, one is the S-NSSAI of the PDU session, the S-NSSAI of the PDU session being the S-NSSAI associated with a PDU session identifier contained in the N2 SM information transmitted from a core network to a base station during a PDU session setup process in the current 3GPP specification 23.502, or the S-NSSAI of the PDU session being the S-NSSAI associated with a PDU session identifier transmitted from a UE to a core network during the PDU session setup process in the current 3GPP specification 23.502; the second one is the S-NSSAI which can be configured to the PDU session when the S-NSSAI of the above-mentioned PDU session is not supported, overloaded, or unavailable, hereinafter referred to as assisting S-NSSAI(s). The third one is the S-NSSAI actually configured by the base station to the PDU session according to the supported slice information, resource conditions and/or slice policy information, hereinafter referred to as configured S-NSSAI.

Modern mobile communication tends to provide users with multimedia services with high-speed transmission, as shown in FIG. 1, which is the system architecture diagram of system architecture evolution (SAE).

User equipment (UE) 101 is a terminal device for receiving data. An evolved universal terrestrial radio access network (E-UTRAN) 102 is a radio access network, which includes a macro base station (eNodeB/NodeB) that provides UE with an interface for accessing the radio network. A mobility management entity (MME) 103 is responsible for managing the mobility context, session context and security information of the UE. A serving gateway (SGW) 104 mainly provides function of user plane, and the MME 103 and the SGW 104 may be in a same physical entity. A packet data network gateway (PGW) 105 is responsible for charging, lawful interception, etc., and may be in the same physical entity as SGW 104. A policy and charging rules function entity (PCRF) 106 provides quality of service (QoS) policies and charging rules. A general packet radio service support node (SGSN) 108 is a network node device that provides routing for data transmission in universal mobile telecommunications system (UMTS). A home subscriber server (HSS) 109 is a home subsystem of the UE, and is responsible for protecting user information including the current location of the user equipment, address of a serving node, user security information, and packet data context of the user equipment.

Figure 2:
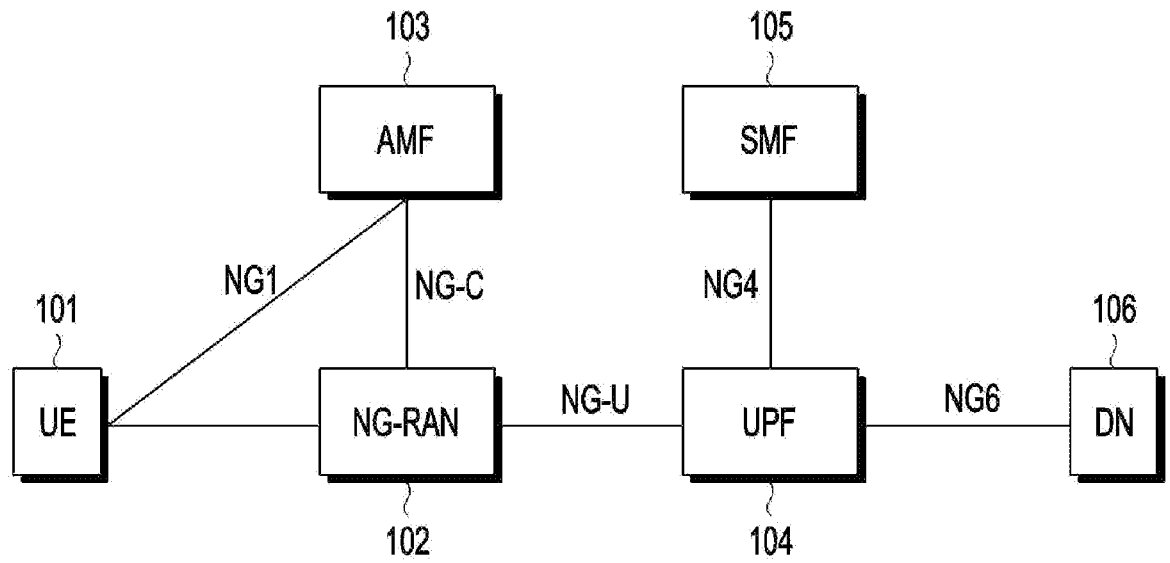
FIG. 2 illustrates an architecture diagram of a next generation communication system or a 5G communication system according to an embodiment of the present disclosure.

A system architecture diagram of a next generation network or the fifth generation 5G network is illustrated in FIG. 2, wherein:

A user equipment (UE) 201 is a terminal device for receiving data. The next generation radio access network (NG-RAN) 202 is a radio access network, which includes a base station (gNB or an eNB connected to a 5G Core network (5GC) which is also called ng-gNB) that provides UE with an interface for accessing the radio network. An access control and mobility management functional entity (AMF) 203 is responsible for managing the mobility context and security information of the UE. A user plane function entity (UPF) 204 mainly provides functions of a user plane. A session management function entity (SMF) 205 is responsible for session management. For example, a data network (DN) 206 includes services of operators, Internet access and services of third parties.

The disclosure provides an improved method and device for session setup and handover.

Figure 3:
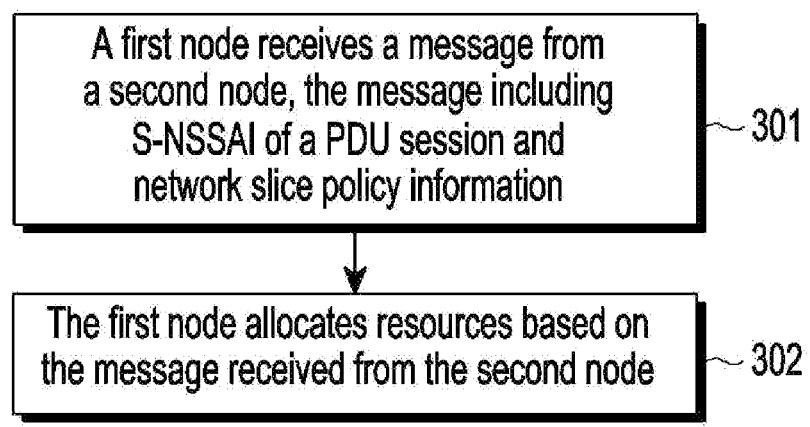
FIG. 3 illustrates an exemplary method for a PDU session setup and handover according to an embodiment of the present disclosure.

An exemplary method of session setup and handover according to the present disclosure is illustrated in FIG. 3. A detailed description of steps unrelated to the present disclosure is omitted here. The method comprises the following steps:

At step 301, a first node receives a message for requesting PDU session setup from a second node. The message includes single network slice selection assistance information (S-NSSAI) for a PDU session to be configured, and also includes network slice policy information. When the first node does not support the S-NSSAI or resources of the S-NSSAI are unavailable or overloaded, considering the network slice policy information, the first node allocates resources for the PDU session. The network slice policy information may be an assisting S-NSSAI(s), and the assisting S-NSSAI(s) may be one or more S-NSSAI(s). For each PDU session, the assisting S-NSSAI(s) may be one or more S-NSSAI(s). When there are a plurality of assisting S-NSSAIs, the plurality of assisting S-NSSAIs may have different priorities. For example, the S-NSSAI placing ahead may have a higher priority than the S-NSSAI placing behind. The first node prioritizes the resources of an assisting S-NSSAI with a higher priority when allocating resources.

The first node may be a base station or a core network node. The second node may be a core network node or a base station. The core network node may be a SMF or an AMF. By way of example, the message received by the first node from the second node may be transmitted from the core network node as the second node to the base station as the first node, from a first base station as the second node to a second base station as the first node (for example, from a source base station to a target base station), from a first core network node as the second node to a second core network node as the first node (for example, from a source core network node to a target core network node), or from the base station as the first node to the core network node as the second node. According to specific implementations of the first node and the second node, the message may be, for example, an initial UE context setup request message (when the first node is a base station and the second node is a core network node), a PDU session resource setup request message (when the first node is a base station and the second node is a core network node), a handover request message (when the first node is a target base station and the second node is a core network node or the first node is a target base station and the second node is a source base station), a handover required message (when the first node is a source core network node and the second node is a source base station), a path switch request acknowledgement message (when the first node is a target base station and the second node is a core network node), or a create UE context request message (when the first node is a target core network node and the second node is a source core network node), etc. The above enumerations are only examples, but not limitations.

The network slice policy information may be decided by considering a network slice selection policy (NSSP), subscription information of the UE, quality of service (QoS) information of a traffic, and the S-NSSAI supported by the AMF, and/or the S-NSSAI supported by the SMF, etc. The entity that determines the network slice policy information may be a core network node.

At step 302, the first node receives a message for a session setup request. The first node stores the received PDU session information, including the S-NSSAI for the PDU session and network slice policy information.

The first node considers the S-NSSAI in the message when allocating resources for the PDU session requested to be set up or resources need to be reallocated if the slice is overloaded. When the first node or a cell of the first node does not support the S-NSSAI or slice resources of the S-NSSAI are overloaded or unavailable, the first node allocates resources for the PDU session considering the network slice policy information. For example, the first node considers allocating resources of the assisting S-NSSAI. If the message received by the first node includes a plurality of assisting S-NSSAIs, the first node prioritizes the slice resources of a S-NSSAI with a higher priority.

The method may further comprise the following steps:

The first node transmits an actually configured S-NSSAI for the PDU session to the core network. According to the actually configured S-NSSAI for the UE, the core network may reselect the session management function entity and/or the user plane function entity of the PDU session for the UE. For example, the base station transmits the actually configured S-NSSAI for the PDU session to the AMF, and the AMF reselects the SMF and/or the UPF for the PDU session of the UE. Alternatively, the base station transmits the actually configured S-NSSAI for the PDU session to the SMF, and the SMF reselects the UPF for the PDU session of the UE. This step is applicable to the case where the first node is a base station.

When the method is used for handover, the second base station (the target base station) does not support the S-NSSAI of a PDU session, another network slice resources are configured for the PDU session according to the network slice policy information. When the second base station as the source base station triggers the handover of the UE to the third base station, as described in step 301, the handover request message includes the S-NSSAI of the PDU session and the network slice policy information. If the third base station supports the S-NSSAI, the third base station configures the PDU session on resources of the S-NSSAI for the PDU session. This method can ensure that the most suitable resources are always configured for the PDU session of the UE.

In a case where the method is only used for handover, when the source base station triggers the handover of the UE to the target base station, as described in step 301, the message is a handover request message, which includes the S-NSSAI of the PDU session and the network slice policy information; if the resources actually configured by the source base station for the PDU session are the resources of the configured S-NSSAI of the PDU session selected based on the network slice policy information, the handover request message may include the configured S-NSSAI. If the target base station supports the S-NSSAI of the PDU session, the PDU session is configured on resources of the S-NSSAI for the PDU session. If the target base station does not support the S-NSSAI of a PDU session or the S-NSSAI of the PDU session is overloaded or unavailable, it configures other network slice resources for the PDU session according to the network slice policy information. This method can ensure that the most suitable resources are always configured for the PDU session of the UE. At this point, the description of an exemplary PDU session setup method and an exemplary handover method of the present disclosure is completed. The method can avoid or reduce the problem of service interruption caused by a session handover failure when the UE moves or hands over between different base stations or the problem of a session setup failure in a process of session setup. At the same time, during UE's movement and handover or the process of the session setup, the network can always preferentially allocate an ongoing session on the most suitable resources. When the most suitable resources are unavailable, it can do its best to serve the UE. And after multiple handovers, it can ensure that the most suitable resources are always configured for the PDU session of the UE.

Figure 4:
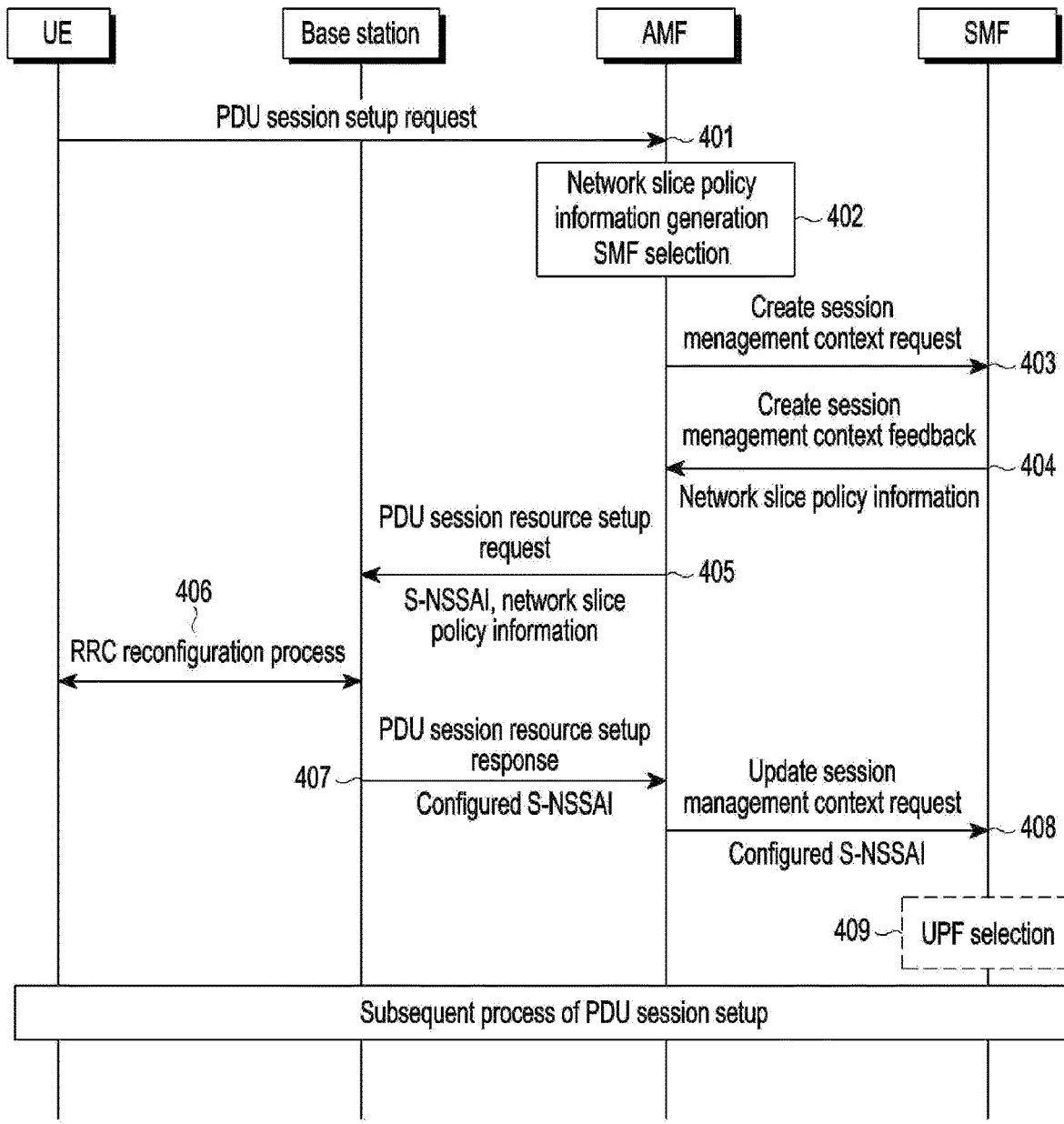
FIG. 4 illustrates one embodiment of the exemplary method illustrated in FIG. 3.

An embodiment of a method of session setup and handover of the present disclosure is illustrated in FIG. 4. A detailed description of steps unrelated to the present disclosure is omitted here. The following steps are included:

At step 401, a UE initiates a non-access stratum (NAS) PDU session setup request message to an AMF, the message including a PDU session identifier, one or more S-NSSAI(s), a UE and core network interface (N1) session management (SM) container. The S-NSSAI(s) is in the allowed NSSAI of the current access type.

At step 402, AMF generates network slice policy information. The AMF may determine the network slice policy information for each PDU session according to a network slice policy (NSSP), subscription information of the UE, the allowed NSSAI of the UE, the supported S-NSSAI by a base station serving the UE and/or the AMF and/or a SMF, etc. The network slice policy information may be an assisting S-NSSAI(s), and the assisting S-NSSAI(s) may be one or more. For each PDU session, the assisting S-NSSAI(s) may be one or more. When there are a plurality of assisting S-NSSAIs, the plurality of assisting S-NSSAIs may have different priorities. For example, the S-NSSAI placing ahead may have a higher priority than the S-NSSAI placing behind.

When the AMF selects the SMF, if it is necessary to inquire about network slice selection function (NSSF) and network repository function (NRF), network slice policy information may be carried in a network slice selection acquisition process between the AMF and the NSSF and in a network function discovery request process between the AMF and the NSSF, so that a more suitable SMF is selected. When a plurality of SMFs support the S-NSSAI of the requested PDU session, the SMF supporting the most number of assisting S-NSSAIs in the network slice policy information is selected among the plurality of SMFs.

The AMF stores the S-NSSAI for the PDU session and the network slice policy information.

At step 403, the AMF transmits, to the selected SMF, a create session management context request message, which may carry the network slice policy information of each PDU session requested to the SMF. If the SMF does not support the S-NSSAI in the network slice policy, the SMF will update the network slice policy information to ensure that the S-NSSAIs in the network slice policy are all supported by the SMF.

At step 404, the SMF transmits, to the AMF, a create session management context response message, which includes updated network slice policy information of each PDU session managed by SMF. The AMF stores the updated network slice policy information.

At step 405, the AMF initiates an initial context setup request message or PDU session resource setup request message to the base station, the message carrying the S-NSSAI and network slice policy information that are necessary to set up the PDU session.

It should be noted that there are three kinds of S-NSSAIs involved in the present disclosure, one is the S-NSSAI of the PDU session, the S-NSSAI of the PDU session being the S-NSSAI associated with a PDU session identifier contained in the N2 SM information transmitted from a core network to a base station during a PDU session setup process in the current 3GPP specification 23.502, or the S-NSSAI of the PDU session is the S-NSSAI associated with a PDU session identifier transmitted from a UE to a core network during the PDU session setup process in the current 3GPP specification 23.502; the second one is the S-NSSAI which can be configured to the PDU session, when the S-NSSAI of the PDU session is unsupported or unavailable, hereinafter referred to as assisting S-NSSAI(s). The third one is the S-NSSAI actually configured by the base station to the PDU session according to the supported slice information, resource conditions and/or slice policy information, hereinafter referred to as the configured S-NSSAI.

For the PDU session needed to be set up, the base station preferentially configures the resources of the S-NSSAI of the PDU session for the PDU session requested to be set up. If the base station does not support the S-NSSAI of the PDU session or the slice resources of the S-NSSAI of the PDU session are overloaded or unavailable, the base station may select a S-NSSAI serving the PDU session according to the network slice policy information, and the base station may select a S-NSSAI with a high priority from those supported by the base station in the network slice policy information. The S-NSSAI selected by the base station from the network slice policy information is the configured S-NSSAI, which is a conditional information element and exists only when the network slice resource corresponding to the S-NSSAI of the PDU session is unsupported, overloaded or unavailable. When the network slice policy information is an assisting S-NSSAI(s), the base station selects the configured S-NSSAI from the assisting S-NSSAI(s).

The base station stores the S-NSSAI, the configured S-NSSAI and the network slice policy information for all PDU sessions.

At step 406, the base station transmits a radio resource control (RRC) reconfiguration message to the UE. The message includes a NAS message of PDU session setup complete, which carries the S-NSSAI and the configured S-NSSAI of each PDU session. If the configured S-NSSAI appears, it means that the network slice resource used by the corresponding PDU session is not the slice resource corresponding to the S-NSSAI of the PDU session, but the slice resource corresponding to the assisting S-NSSAI.

Upon receiving the message, the UE stores information of the S-NSSAI and the configured S-NSSAI for all PDU sessions.

At step 407, the base station transmits an initial context setup response message or PDU session resource setup response message to the AMF, and the message may carry the configured S-NSSAI of the PDU session.

At step 408, if the configured S-NSSAI is carried in the message, the configured S-NSSAI can be carried in an update session management context request transmitted from the AMF to the SMF.

At step 409, the SMF may reselect the UPF for the PDU session according to the configured S-NSSAI, and perform a UPF selection process.

At this point, the description of an embodiment of an exemplary PDU session setup method and an exemplary handover method of the present disclosure is completed. The method can avoid or reduce the problem of service interruption caused by a session handover failure when the UE moves or hands over between different base stations. At the same time, during UE's movement and handover, the network can always preferentially configure an ongoing session to the most suitable resources. When the most suitable resources are unavailable, it can do its best to serve the UE. And after multiple handovers, it can ensure that the most suitable resources are always configured for the PDU session of the UE.

Figure 5:
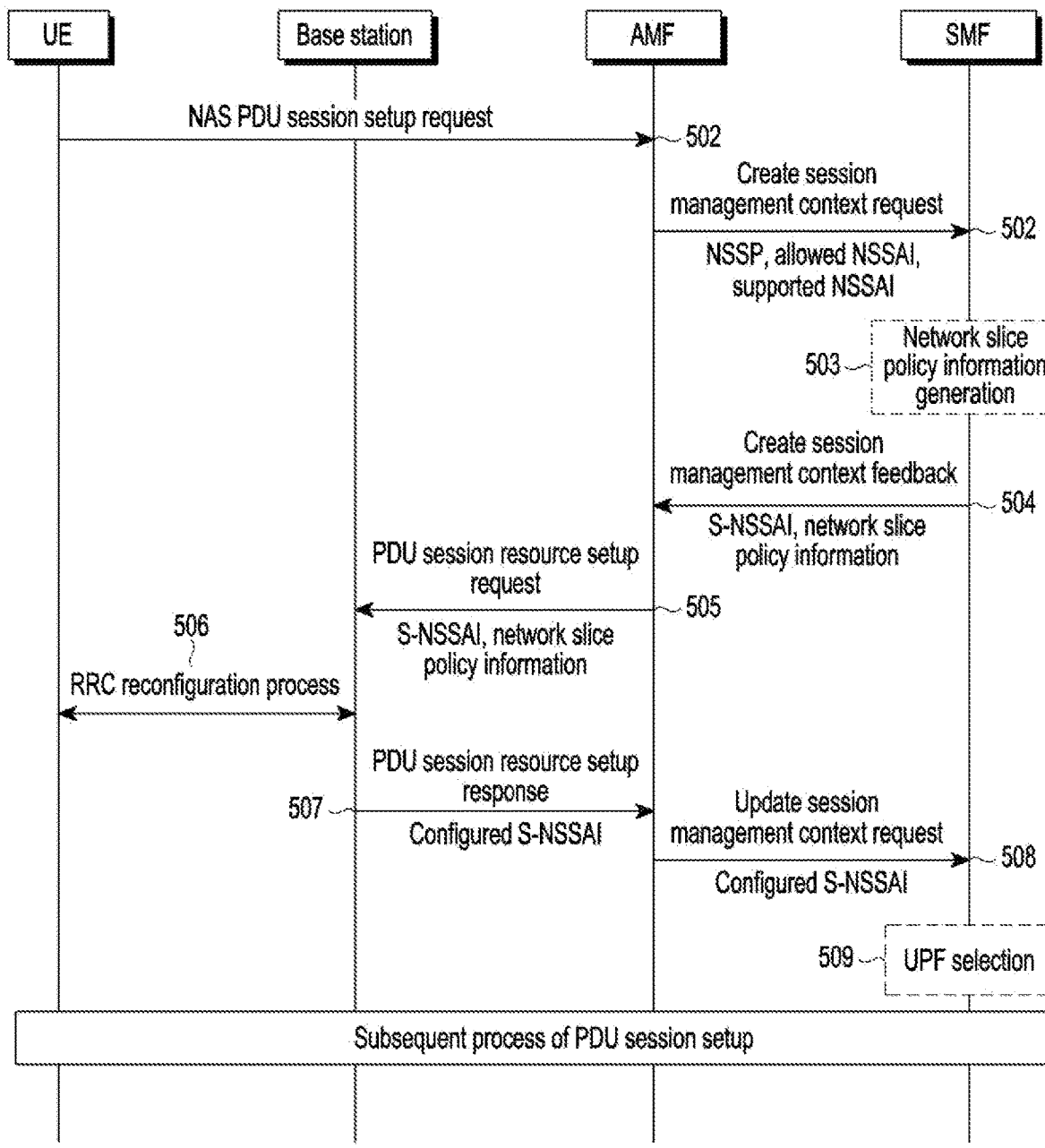
FIG. 5 illustrates another embodiment of the exemplary method illustrated in FIG. 3.

Another embodiment of a method of session setup and handover of the present disclosure is illustrated in FIG. 5. A detailed description of steps unrelated to the present disclosure is omitted here. the method includes the following steps:

At step 501, a UE initiates a NAS PDU session setup request message to an AMF, the message including a PDU session identifier, one or more S-NSSAIs, and a N1 session management (SM) container. The S-NSSAI is in the allowed NSSAI of the current access type.

At step 502, when an AMF selects a SMF, if a NSSF and a NRF need to be inquired, a NSSP may be carried in a network slice selection acquisition process between the AMF and the NSSF and in a network function discovery request process between the AMF and the NRF, so that a more suitable SMF is selected.

The AMF initiates a create session management context request message to the SMF, and the message may carry the NSSP, subscription information of the UE, Qos information, the allowed NSSAI, and/or the supported S-NSSAI by a network node serving the UE, etc. The network node includes a core network entity and a base station.

At step 503, SMF may determine the network slice policy information for each PDU session according to the NSSP, the subscription information of the UE, the Qos information, the allowed NSSAI, and/or the supported S-NSSAI by a network entity serving the UE, etc. The network slice policy information may be an assisting S-NSSAI(s), and the assisting S-NSSAI(s) may be one or more. For each PDU session, the assisting S-NSSAI(s) may be one or more. When there are a plurality of assisting S-NSSAIs, the plurality of assisting S-NSSAIs may have different priorities. For example, the S-NSSAI placing ahead may have a higher priority than the S-NSSAI placing behind.

The SMF stores S-NSSAI of PDU session and the network slice policy information.

At step 504, the SMF transmits, to the AMF, a create session management context response message, which includes the S-NSSAI and network slice policy information of each PDU session managed by SMF. The AMF stores the network slice policy information.

At step 505, the AMF initiates an initial context setup request message or PDU session resource setup request message to the base station, and the message carries the S-NSSAI and network slice policy information that is necessary to set up the PDU session.

For a PDU session that need to be set up, the base station preferentially configures the resources of the S-NSSAI of the PDU session for the PDU session requested to be set up. If the base station does not support the S-NSSAI of the PDU session or the slice resources of the S-NSSAI of the PDU session are overloaded or unavailable, the base station may select a S-NSSAI serving the PDU session according to the network slice policy information, and the base station may select a S-NSSAI with a high priority from those supported by the base station in the network slice policy information. The S-NSSAI selected by the base station from the network slice policy information is referred to as the configured S-NSSAI, which is a conditional information element and exists only when the network slice resource corresponding to the S-NSSAI of the PDU session is unsupported, overloaded or unavailable. When the network slice policy information is an assisting S-NSSAI(s), the base station selects the configured S-NSSAI from the assisting S-NSSAI(s).

The base station stores the S-NSSAI, the configured S-NSSAI and the network slice policy information of all PDU sessions.

At step 506, the base station transmits a RRC reconfiguration message to the UE. The message includes a NAS message of PDU session setup complete, which carries the S-NSSAI and the configured S-NSSAI of each PDU session. If the configured S-NSSAI appears, it means that the network slice resource used by the corresponding PDU session is not the slice resources of the S-NSSAI of the PDU session, but the slice resource corresponding to the assisting S-NSSAI.

Upon receiving the message, the UE stores the information of S-NSSAI and configured S-NSSAI of all PDU sessions.

At step 507, the base station transmits an initial context setup response message or PDU session resource setup response message to the AMF, and the message may carry the configured S-NSSAI of the PDU session. At step 508, if the configured S-NSSAI is carried in the message, the configured S-NSSAI can be carried in an update session management context request transmitted from the AMF to the SMF. At step 509, the SMF may reselect a UPF for the PDU session according to the configured S-NSSAI, and perform a UPF selection process. And if the SMF does not receive the information of configured S-NSSAI in the message, the SMF knows that the corresponding PDU session uses slice resources of the S-NSSAI of the PDU session.

At this point, the description of another embodiment of an exemplary PDU session setup method and an exemplary handover method of the present disclosure is completed. The method can avoid or reduce the problem of service interruption caused by a session handover failure when the UE moves or hands over between different base stations. At the same time, during UE's movement and handover, the network can always preferentially configure an ongoing session to the most suitable resources. When the most suitable resources are unavailable, it can do its best to serve the UE. And after multiple handovers, it can ensure that the most suitable resources are always configured for the PDU session of the UE.

Figure 6:
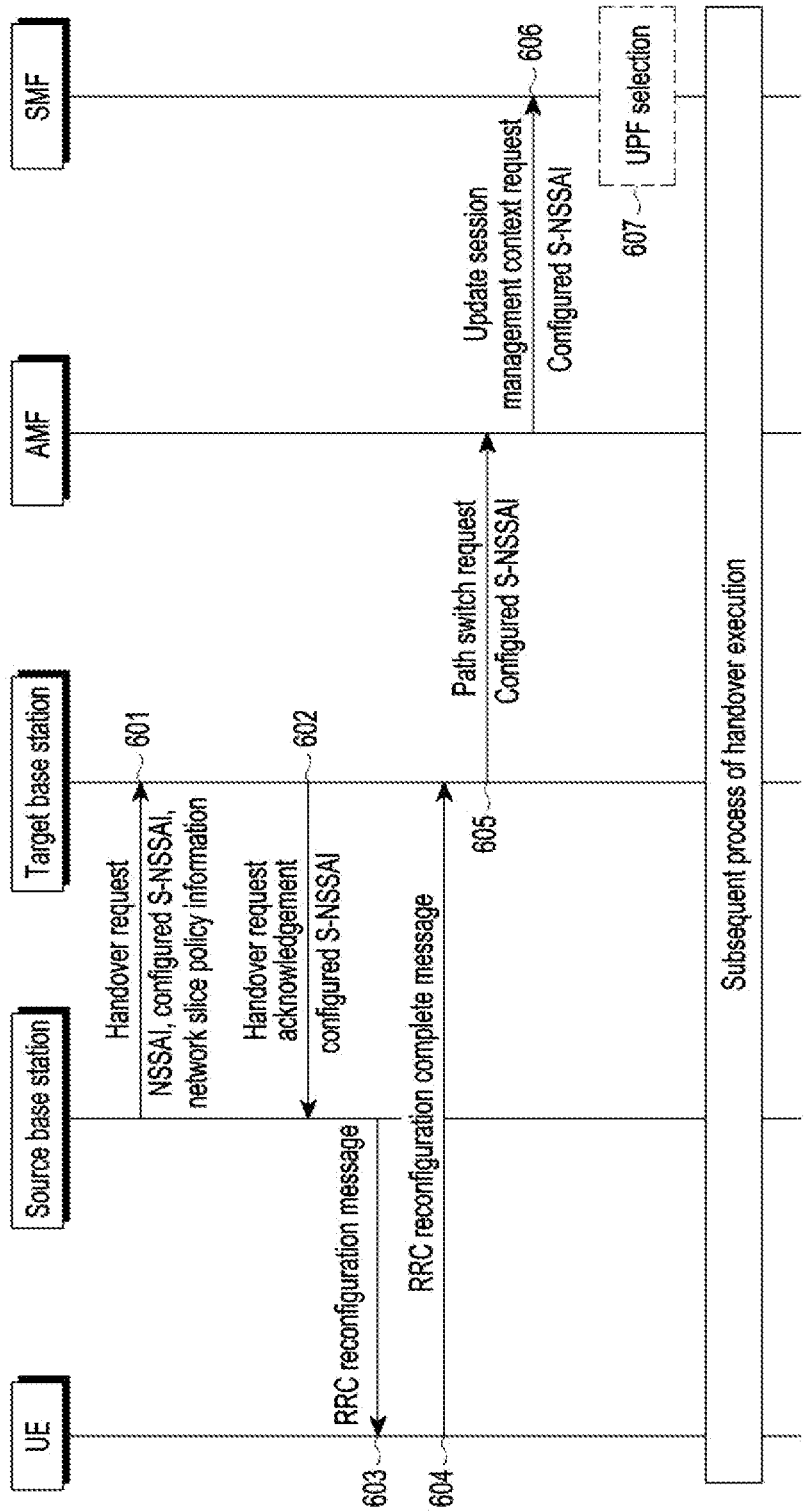
FIG. 6 illustrates another embodiment of the exemplary method illustrated in FIG. 3.

Another embodiment of a method of session setup and handover of the present disclosure is illustrated in FIG. 6. A detailed description of steps unrelated to the present disclosure is omitted here. The method includes the following steps:

At step 601, a source base station transmits a handover request message to a target base station, the message carrying an S-NSSAI, a configured S-NSSAI and/or network slice policy information for each PDU session requested to be set up. The configured S-NSSAI is a conditional information element, which appears only when the slice resource actually used by the PDU session at the source base station is the resource corresponding to a assisting S-NSSAI.

The target base station preferentially configures the resources of the S-NSSAI of the PDU session for the PDU session requested to be set up. If the target base station does not support the S-NSSAI of the PDU session or the slice resources of the S-NSSAI are overloaded or unavailable, the target base station may select the slice resources serving the PDU session according to the network slice policy information. If the network slice policy information includes a plurality of assisting S-NSSAIs and/or priority information of the assisting S-NSSAIs, the target base station selects resources of a S-NSSAI with a high priority. For example, the target base station may select a S-NSSAI with the highest priority supported by the target base station in the network slice policy information. After a successful selection, the newly selected S-NSSAI is indicated by the configured S-NSSAI.

If the target base station receives the configured S-NSSAI but it supports the S-NSSAI of the PDU session, the target base station selects back the slice resources of the S-NSSAI of the PDU session for the PDU session to ensure that the PDU session always uses the optimal slice resources supported by the network. After a successful selection, the target base station will delete the information of configured S-NSSAI in the PDU session context.

The target base station stores the network slice information actually configured for PDU session.

In step 602, the target base station transmits a handover request acknowledgement message to the source base station. The message includes a target to source transparent container. If the network slice resources serving the PDU session are the slice resources of the configured S-NSSAI, the message carries information about the configured S-NSSAI for the PDU session.

At step 603, if the slice resources of the PDU session are the resources of the configured S-NSSAI after the handover is completed, the source base station transmits a handover execution command to the UE through an RRC reconfiguration message, which carries the configured S-NSSAI of the PDU session. The UE stores the information of configured S-NSSAI of all PDU sessions. And if the UE does not receive the information of configured S-NSSAI in the message, the UE knows that the corresponding PDU session uses slice resources of the S-NSSAI of the PDU session.

The UE transmits an RRC reconfiguration complete message to the target base station to indicate that the handover is completed.

At step 604, the target base station initiates a path switch request to the AMF, which carries the configured S-NSSAI for the PDU session.

At step 605, the AMF transmits the configured S-NSSAI for the PDU session to the SMF through an update session management context request message. If the SMF does not receive the information of configured S-NSSAI in the message, the SMF knows that the corresponding PDU session uses slice resources of the S-NSSAI of the PDU session.

At step 607, the slice resources actually used by the PDU session may change, for example, the slice resources actually used by the PDU session change from the resources of the S-NSSAI of the PDU session to the resources of the configured S-NSSAI, or from the resources of the configured S-NSSAI to the resources of the S-NSSAI of the PDU session. According to the changed S-NSSAI information, the SMF may reselect the UPF for the PDU session and perform a UPF selection process.

At this point, the description of yet another embodiment of an exemplary PDU session setup method and an exemplary handover method of the present disclosure is completed. The method can avoid or reduce the problem of service interruption caused by a session handover failure when the UE moves or hands over between different base stations. At the same time, during UE's movement and handover, the network can always preferentially configure an ongoing session to the most suitable resources. When the most suitable resources are unavailable, it can do its best to serve the UE. And after multiple handovers, it can ensure that the most suitable resources are always configured for the PDU session of the UE.

Figure 7:
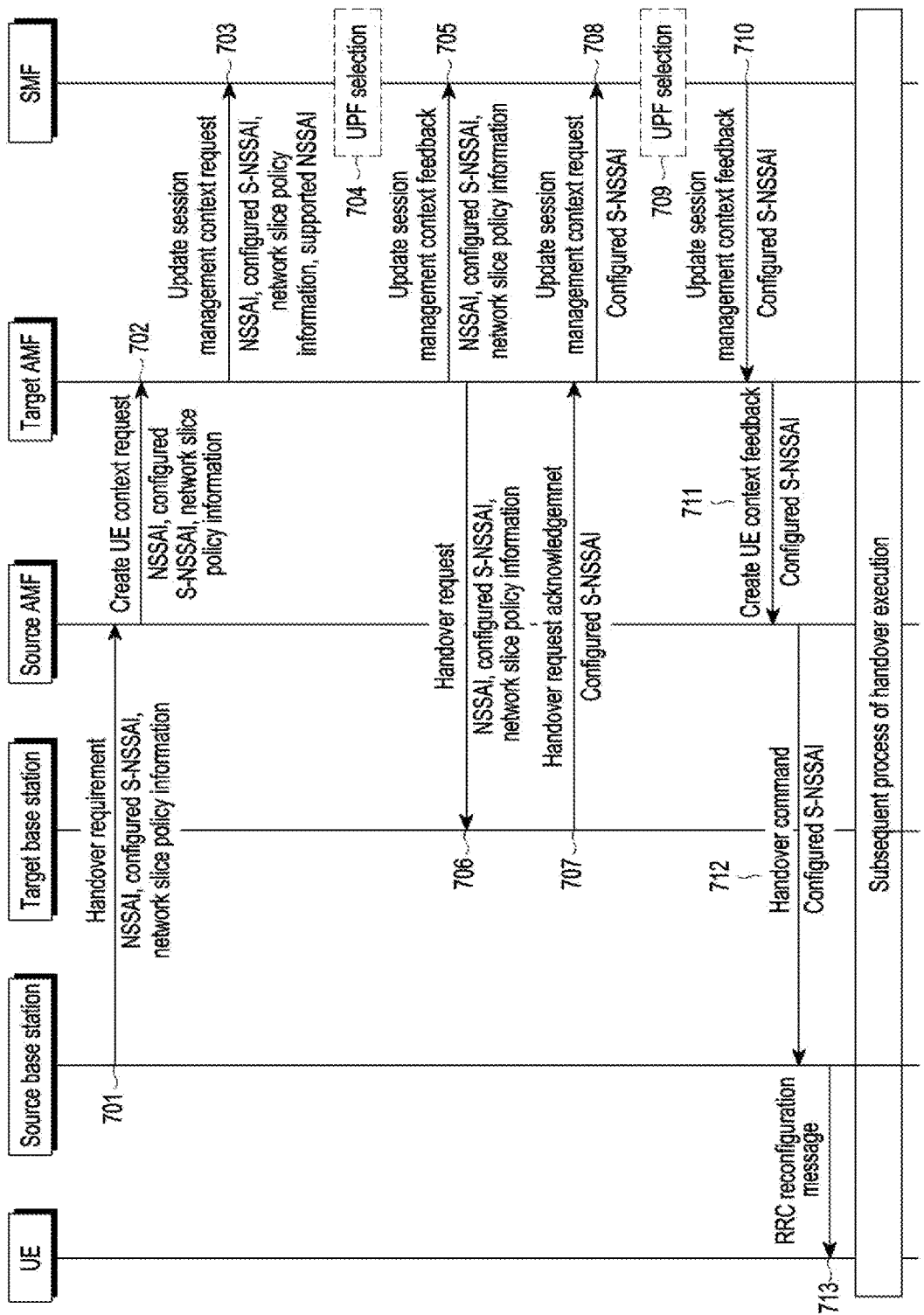
FIG. 7 illustrates yet another embodiment of the exemplary method illustrated in FIG. 3.

Yet another embodiment of a method of session setup and handover of the present disclosure is illustrated in FIG. 7. A detailed description of steps unrelated to the present disclosure is omitted here. The method include the following steps:

At step 701, a source base station initiates a handover required message to a source AMF. The message carries an S-NSSAI, a configured S-NSSAI and/or network slice policy information of each PDU session requested. The configured S-NSSAI is a conditional information element, which appears only when the slice resource actually used by the PDU session at the source base station is the resource corresponding to the assisting S-NSSAI.

At step 702, the source AMF transmits a create UE context request message to a target AMF, the message including a handover required transfer container from the source base station. The message includes a SM N2 information list, a PDU session identification list and UE context information. The UE context information includes a PDU session identification list, SMF information corresponding to a PDU session, S-NSSAI for the PDU session, and configured S-NSSAI for the PDU session.

At step 703, the target AMF transmits an update session management context request message to the SMF, the message including an S-NSSAI, a configured S-NSSAI and/or network slice policy information of each PDU session requested to be set up during a handover process, and a supported S-NSSAI of the target AMF and the target base station.

The SMF preferentially configures the resources of the S-NSSAI of the PDU session for the PDU session requested to be set up. If the target network does not support the S-NSSAI of the PDU session or the slice resources of the S-NSSAI are overloaded or unavailable, the SMF may select the slice resources serving the PDU session according to the network slice policy information. If the network slice policy information includes a plurality of assisting S-NSSAIs and/or priority information of the assisting S-NSSAIs, the SMF selects resources of the S-NSSAI with a high priority. For example, the SMF may select the S-NSSAI with the highest priority supported by the target network in the network slice policy information. After a successful selection, the newly selected S-NSSAI is indicated by the configured S-NSSAI. The target network includes a target base station and a target core network.

If the SMF receives the configured S-NSSAI but the target network supports the S-NSSAI of the PDU session, the SMF selects back the slice resources of the S-NSSAI of the PDU session for the PDU session to ensure that the PDU session always uses the optimal slice resources supported by the network. After a successful selection, the SMF deletes the information of configured S-NSSAI in the PDU session context.

The SMF stores the network slice information actually configured for PDU session.

The SMF can reconfigure the network slice policy information. If the SMF reconfigures the network slice policy information of PDU session, the SMF selects the configured S-NSSAI for PDU session according to updated network slice policy information when the S-NSSAI of the PDU session is not supported.

At step 704, because the slice resources actually used by the PDU session may change, for example, the slice resources actually used by the PDU session change from the resources of the S-NSSAI of the PDU session to the resources of the configured S-NSSAI, or from the resources of the configured S-NSSAI to the resources of the S-NSSAI of the PDU session, the SMF may reselect the UPF for the PDU session according to the changed S-NSSAI information, and perform a UPF selection process.

At step 705, the SMF transmits an update session management context response message to the target AMF, the message carrying the updated S-NSSAI, configured S-NSSAI and/or network slice policy information of each PDU session.

At step 706, the target AMF transmits a handover request message to a target base station, the message carrying an S-NSSAI, a configured S-NSSAI and/or network slice policy information of each PDU session requested to be set up. The configured S-NSSAI is a conditional information element, which appears only when the slice resource actually used by the PDU session at the source base station is the resource corresponding to the assisting S-NSSAI.

The target base station preferentially configures the resources of the S-NSSAI of the PDU session for the PDU session requested to be set up. If the target base station does not support the S-NSSAI of the PDU session or the slice resources of the S-NSSAI are overloaded or unavailable, the target base station may select the slice resources serving the PDU session according to the network slice policy information. If the network slice policy information includes a plurality of assisting S-NSSAIs and/or priority information of the assisting S-NSSAIs, the target base station selects resources of a S-NSSAI with a high priority. For example, the target base station may select a S-NSSAI with the highest priority supported by the target base station in the network slice policy information. After a successful selection, the newly selected S-NSSAI is indicated by the configured S-NSSAI.

If the target base station receives the configured S-NSSAI but it supports the S-NSSAI of the PDU session, the target base station selects back the slice resources of the S-NSSAI of the PDU session for the PDU session to ensure that the PDU session always uses the optimal slice resources supported by the network. After a successful selection, the target base station deletes the information of configured S-NSSAI in the PDU session context.

The target base station stores the network slice information actually configured for PDU session.

At step 707, the target base station transmits a handover request acknowledgement message to the target AMF, if the network slice resources serving the PDU session are the network slice resources of the configured S-NSSAI, the message carries information of the configured S-NSSAI of the PDU session.

At step 708, the AMF transmits the configured S-NSSAI of the PDU session to the SMF through an update session management context request message. If the SMF does not receive the information of configured S-NSSAI in the message, the SMF knows that the corresponding PDU session uses slice resources of the S-NSSAI of the PDU session.

At step 709, because the slice resources actually used by the PDU session may change, for example, the slice resources actually used by the PDU session change from the resources of the S-NSSAI of the PDU session to the resources of the configured S-NSSAI, or from the resources of the configured S-NSSAI to the resources of the S-NSSAI of the PDU session, the SMF may reselect the UPF for the PDU session according to the changed S-NSSAI information, and perform a UPF selection process.

At step 710, the SMF transmits an update session management context response message to the target AMF.

If the actually configured network slice resources to PDU session are the resources of the configured S-NSSAI, the target AMF can inform the source AMF of this through a create UE context response message (step 711), the source AMF can inform the source base station of this through a handover command message (step 712), and then the source base station informs the UE of this through an RRC reconfiguration message (step 713), wherein, the messages all carry the configured S-NSSAI to PDU session successfully set up after handover.

The UE stores the information of configured S-NSSAI of all PDU sessions.

And if the UE does not receive the information of configured S-NSSAI in the message, the UE knows that the corresponding PDU session uses slice resources of the S-NSSAI of the PDU session.

At this point, the description of yet another embodiment of an exemplary PDU session setup method and an exemplary handover method of the present disclosure is completed. The method can avoid or reduce the problem of service interruption caused by a session handover failure when the UE moves or hands over between different base stations. At the same time, during UE's movement and handover, the network can always preferentially configure an ongoing session to the most suitable resources. When the most suitable resources are unavailable, it can do its best to serve the UE. And after multiple handovers, it can ensure that the most suitable resources are always configured for the PDU session of the UE.

Figure 8:
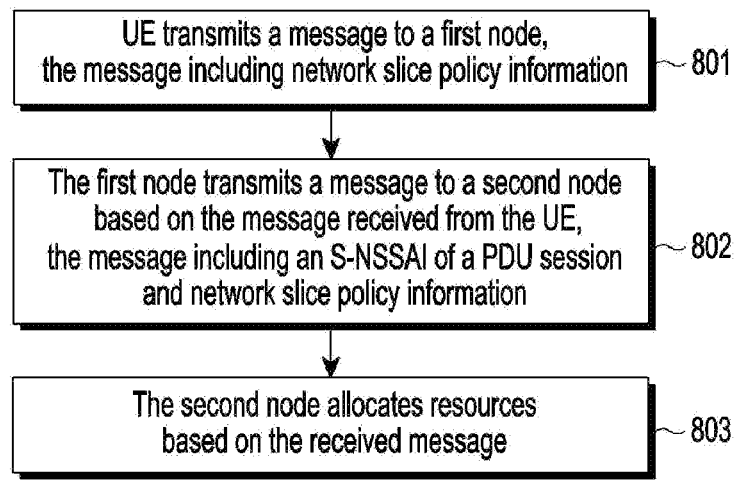
FIG. 8 illustrates another exemplary method for a PDU session setup and handover according to an embodiment of the present disclosure.

Another exemplary method of session setup and handover according to the present disclosure is illustrated in FIG. 8. A detailed description of steps unrelated to the present disclosure is omitted here. The method comprises the following steps:

At step 801, a UE transmits a message to a first node requesting PDU session setup. The message includes single network slice selection assisting information (S-NSSAI) of the PDU session, and also includes network slice policy information. When network does not support the S-NSSAI of the PDU session or the S-NSSAI of the PDU session is overloaded or unavailable, the network allocates resources for the PDU session considering the network slice policy information. The network slice policy information may be an assisting S-NSSAI(s), and the assisting S-NSSAI(s) may be one or more. For each PDU session, the assisting S-NSSAI(s) may be one or more. When there are a plurality of assisting S-NSSAIs, the plurality of assisting S-NSSAIs may have different priorities. For example, the S-NSSAI placing ahead may have a higher priority than the S-NSSAI placing behind. The network prioritizes the resources of an assisting S-NSSAI with a high priority when allocating resources.

The UE determines the network slice policy information according to subscription information of the UE, the service type, the S-NSSAI supported by the UE, and the like.

The first node may be a core network node or a base station. The second node may be a base station or a core network node. The core network node may be a SMF or an AMF.

At step 802, the first node transmits a message to a second node requesting PDU session setup.

The detailed description in step 301 is also applicable to this method, and will not be repeated here. It should be noted that the first node (e.g., a core network node) may transmit the network slice policy information received from the UE to the second node, or the first node may determine the network slice policy information, considering the network slice policy information received from the UE, a network slice selection policy (NSSP), subscription information of the UE, quality of service (QoS) information of a service, and the S-NSSAI supported by the AMF, and/or the S-NSSAI supported by the SMF, etc.

Step 803 is the same as step 302, and will not be repeatedly described here.

The method may further comprise the following steps:

The second node transmits the S-NSSAI actually configured for the PDU session to the core network. According to the actually configured S-NSSAI for the UE, the core network may reselect the session management function entity and/or the user plane function entity of the PDU session for the UE. For example, the base station transmits the actually configured S-NSSAI for the PDU session to the AMF, and the AMF reselects the SMF and/or the UPF for the PDU session of the UE. Alternatively, the base station transmits the actually configured S-NSSAI for the PDU session to the SMF, and the SMF reselects the UPF for the PDU session of the UE.

It should be noted that when this method is used for handover, step 801 is unnecessary.

When the method is used for handover, the second base station (the target base station) does not support the S-NSSAI of a PDU session, and resources of another network slice are configured for the PDU session according to the network slice policy information. When the second base station triggers the handover of the UE to the third base station, as described in step 802, the handover request message includes the S-NSSAI of the PDU session and the network slice policy information. If the third base station supports the S-NSSAI of the PDU session, the third base station configures the PDU session on resources of the S-NSSAI. This method can ensure that the most suitable resources are always configured for the PDU session of the UE.

In a case where the method is only used for handover, when the source base station triggers the handover of the UE to the target base station, the message as described in step 802 is a handover request message, which includes the S-NSSAI of the PDU session and the network slice policy information; if the resources actually configured by the source base station for the PDU session are the resources of the configured S-NSSAI of the PDU session selected based on the network slice policy information, the handover request message may include the configured S-NSSAI. If the target base station supports the S-NSSAI of the PDU session, the PDU session is configured on resources of the S-NSSAI of the PDU session. If the target base station does not support the S-NSSAI of a PDU session or the S-NSSAI of the PDU session is overloaded or unavailable, it configures other network slice resources for the PDU session according to the network slice policy information. This method can ensure that the most suitable resources are always configured for the PDU session of the UE.

Figure 9:
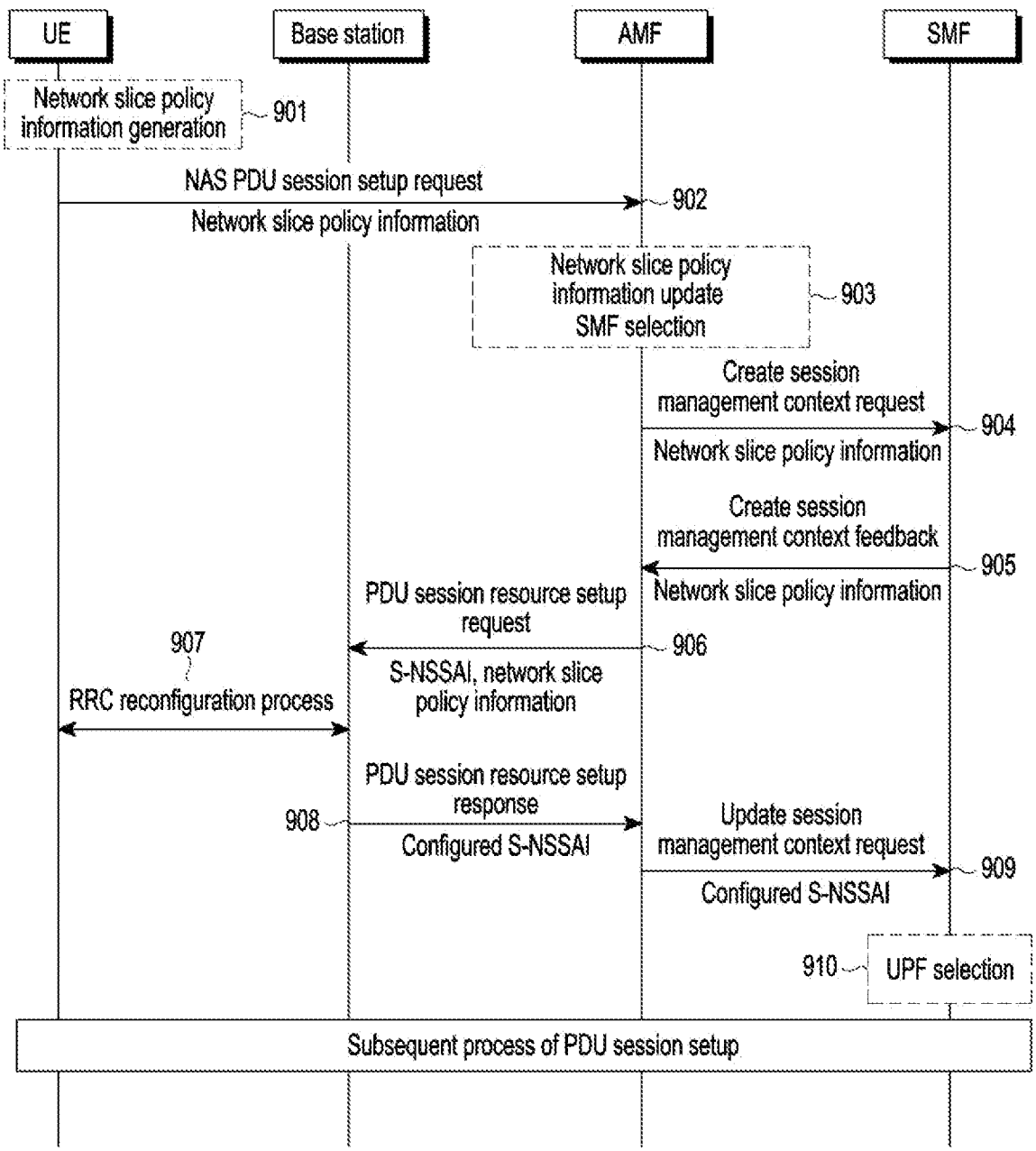
FIG. 9 illustrates one embodiment of the exemplary method illustrated in FIG. 8.

At this point, the description of another exemplary PDU session setup method and an exemplary handover method of the present disclosure is completed. The method can avoid or reduce the problem of service interruption caused by a session handover failure when the UE moves or hands over between different base stations. At the same time, during UE's movement and handover, the network can always preferentially configure an ongoing session to the most suitable resources. When the most suitable resources are unavailable, it can do its best to serve the UE. And after multiple handovers, it can ensure that the most suitable resources are always configured for the PDU session of the UE. An embodiment of a method of session setup and handover of the present disclosure is illustrated in FIG. 9. A detailed description of steps unrelated to the present disclosure is omitted here. The following steps are included:

At step 901, a UE determines network slice policy information according to a NSSP, subscription information of the UE, service types and/or allowed NSSAI of the UE, and the like. The network slice policy information may be an assisting S-NSSAI(s), and the assisting S-NSSAI(s) may be one or more. For each PDU session, the assisting S-NSSAI(s) may be one or more. When there are a plurality of assisting S-NSSAIs, the plurality of assisting S-NSSAIs may have different priorities. For example, S-NSSAI placing ahead may have a higher priority than the S-NSSAI placing behind.

At step 902, a UE initiates a PDU session setup request message to an AMF, the message including a PDU session identifier, one or more S-NSSAIs, the network slice policy information, a N1 session management (SM) container. The S-NSSAI is in the allowed NSSAI of the current access type.

At step 903, the AMF may update the network slice policy information according to the S-NSSAI situation supported by a base station serving the UE and/or the AMF and/or a SMF and local configuration and so on, for example, the assisting S-NSSAI information therein may be updated to ensure that the S-NSSAI in the network slice policy information is supported by the AMF and the base station.

When an AMF selects a SMF, if a NSSF and a NRF need to be inquired, the network slice policy information may be carried in a network slice selection acquisition process between the AMF and the NSSF and in a network function discovery request process between the AMF and the NRF, so that a more suitable SMF is selected. When a plurality of SMFs support the S-NSSAI of the requested PDU session, the SMF supporting the most number of assisting S-NSSAIs in the network slice policy information is selected among the plurality of SMFs.

The AMF stores the S-NSSAI for the PDU session and the network slice policy information.

At step 904, the AMF transmits, to the selected SMF, a create session management context request message, which may carry the network slice policy information of each PDU session requested to the SMF. If the SMF does not support the S-NSSAI in the network slice policy, the SMF will update the network slice policy information to ensure that the S-NSSAIs in the network slice policy information are all supported by the SMF.

At step 905, the SMF transmits, to the AMF, a create session management context response message, which includes updated network slice policy information of each PDU session managed by SMF. The AMF stores the updated network slice policy information.

At step 906, the AMF initiates an initial context setup request message or PDU session resource setup request message to the base station, and the message carries the S-NSSAI and network slice policy information that is necessary to set up the PDU session.

For the PDU session needed to be set up, the base station preferentially configures the resources of the S-NSSAI of the PDU session for the PDU session requested to be set up. If the base station does not support the S-NSSAI of the PDU session or the slice resources of the S-NSSAI of the PDU session are overloaded or unavailable, the base station may select the S-NSSAI serving the PDU session according to the network slice policy information, and the base station may select the S-NSSAI with a high priority from those supported by the base station in the network slice policy information. The S-NSSAI selected by the base station from the network slice policy information is the configured S-NSSAI, which is a conditional information element and exists only when the network slice resource corresponding to the S-NSSAI of the PDU session is unsupported, overloaded or unavailable. When the network slice policy information is an assisting S-NSSAI(s), the base station selects the configured S-NSSAI from the assisting S-NSSAI(s). The base station stores the S-NSSAI, the configured S-NSSAI and the network slice policy information of all PDU sessions.

At step 907, the base station transmits a RRC reconfiguration message to the UE. The message includes a NAS message of PDU session setup complete, which carries the S-NSSAI and the configured S-NSSAI of each PDU session. If the configured S-NSSAI appears, it means that the network slice resource used by the corresponding PDU session is not the slice resources of the S-NSSAI of the PDU session, but the slice resource corresponding to the assisting S-NSSAI.

Upon receiving the message, the UE stores the information of S-NSSAI and the configured S-NSSAI for all PDU sessions.

At step 908, the base station transmits an initial context setup response message or PDU session resource setup response message to the AMF, and the message may carry the configured S-NSSAI of the PDU session. At step 909, if the configured S-NSSAI is carried in the message, the configured S-NSSAI can be carried in an update session management context request transmitted from the AMF to the SMF. At step 910, the SMF may reselect a UPF for the PDU session according to the configured S-NSSAI, and perform a UPF selection process.

At this point, the description of an embodiment of an exemplary PDU session setup method and an exemplary handover method of the present disclosure is completed. The method can avoid or reduce the problem of service interruption caused by a session handover failure when the UE moves or hands over between different base stations. At the same time, during UE's movement and handover, the network can always preferentially configure an ongoing session to the most suitable resources. When the most suitable resources are unavailable, it can do its best to serve the UE. And after multiple handovers, it can ensure that the most suitable resources are always configured for the PDU session of the UE.

Figure 10:
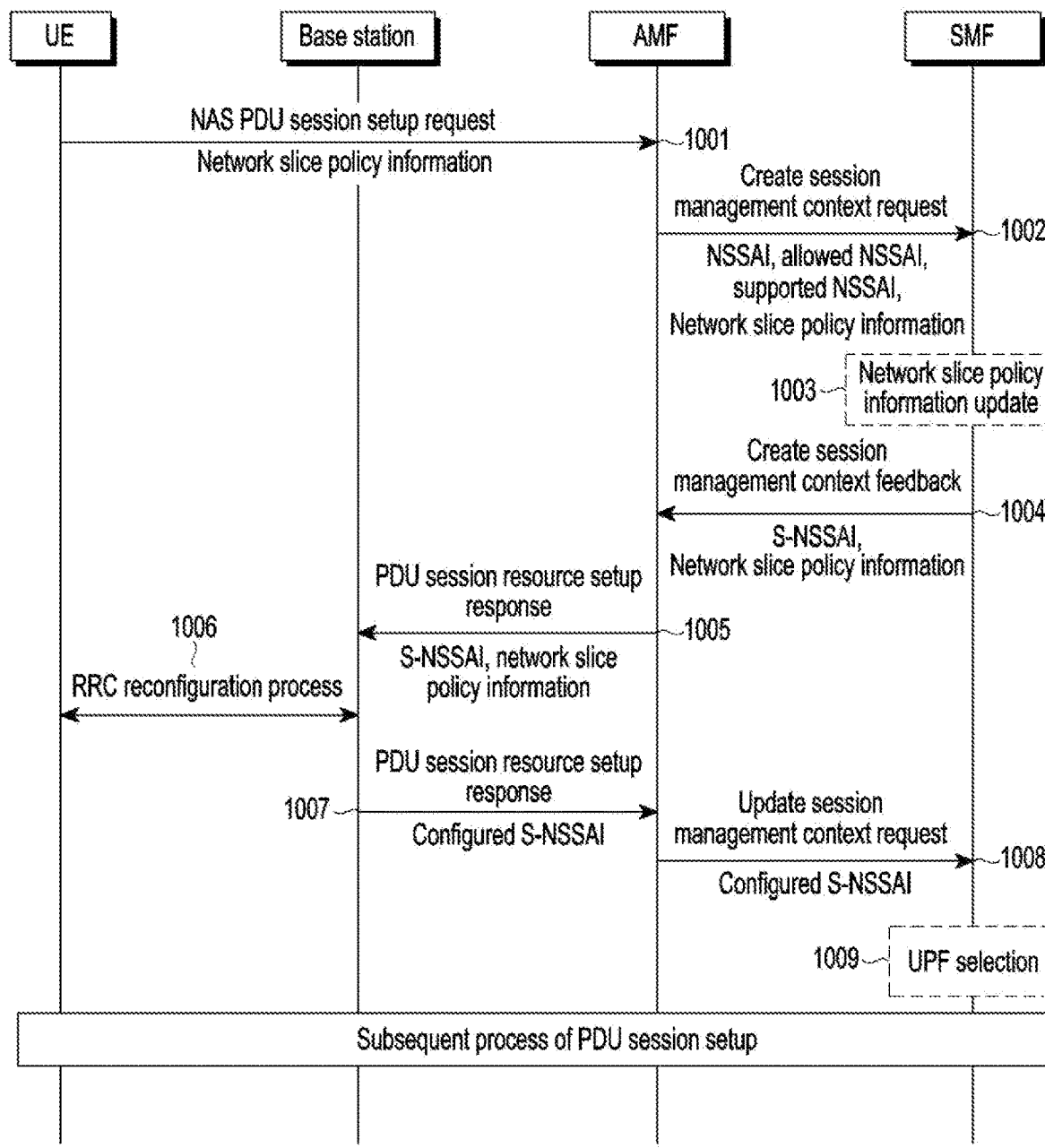
FIG. 10 illustrates another embodiment of the exemplary method illustrated in FIG. 8.

Another embodiment of a method of session setup and handover of the present disclosure is illustrated in FIG. 10. A detailed description of steps unrelated to the present disclosure is omitted here. The following steps are included:

At step 1001, a UE initiates a PDU session setup request message to an AMF, the message including a PDU session identifier, one or more S-NSSAIs, the network slice policy information, a N1 session management (SM) container. The S-NSSAI is in the allowed NSSAI of the current access type.

A UE determines the network slice policy information according to a NSSP, subscription information of the UE, service types and/or allowed NSSAI of the UE, and the like. The network slice policy information may be an assisting S-NSSAI(s), and the assisting S-NSSAI(s) may be one or more. For each PDU session, the assisting S-NSSAI(s) may be one or more. When there are a plurality of assisting S-NSSAIs, the plurality of assisting S-NSSAIs may have different priorities. For example, the S-NSSAI placing ahead may have a higher priority than the S-NSSAI placing behind.

At step 1002, the AMF initiates a create session management context request message to the SMF, and the message may carry the NSSP, subscription information of the UE, the allowed NSSAI, and/or the supported S-NSSAI by a network serving the UE, etc. The network comprises a core network and a base station.

At step 1003, the SMF may update the network slice policy information of each PDU session requested according to the NSSP, the subscription information of the UE, the QoS information, the allowed NSSAI, the supported S-NSSAI by a network node serving the UE, and/or local configuration, etc., to ensure that the S-NSSAI in the network slice policy information is supported by the network. The SMF stores S-NSSAI of PDU session and the network slice policy information.

At step 1004, the SMF transmits, to the AMF, a create session management context response message, which includes the S-NSSAI and network slice policy information of each PDU session managed by SMF. The network slice information is network slice policy information received from the UE or updated by the SMF. The AMF stores the received network slice policy information.

At step 1005, the AMF initiates an initial context setup request message or PDU session resource setup request message to the base station, and the message carries the S-NSSAI and network slice policy information that is necessary to set up the PDU session.

For the PDU session needed to be set up, the base station preferentially configures the resources of the S-NSSAI of the PDU session for the PDU session requested to be set up. If the base station does not support the S-NSSAI of the PDU session or the slice resources of the S-NSSAI of the PDU session are overloaded or unavailable, the base station may select the S-NSSAI serving the PDU session according to the network slice policy information, and the base station may select the S-NSSAI with a high priority from those supported by the base station in the network slice policy information. The S-NSSAI selected by the base station from the network slice policy information is the configured S-NSSAI, which is a conditional information element and exists only when the network slice resource corresponding to the S-NSSAI of the PDU session is unsupported, or overloaded or unavailable. When the network slice policy information is an assisting S-NSSAI(s), the base station selects the configured S-NSSAI from the assisting S-NSSAI(s).

The base station stores the S-NSSAI, the configured S-NSSAI and the network slice policy information of all PDU sessions.

At step 1006, the base station transmits a RRC reconfiguration message to the UE. The message includes a NAS message of PDU session setup complete, which carries the S-NSSAI, the configured S-NSSAI and the network slice policy information of each PDU session. If the configured S-NSSAI appears, it means that the network slice resource used by the corresponding PDU session is not the slice resources of the S-NSSAI of the PDU session, but the slice resource corresponding to the assisting S-NSSAI.

Upon receiving the message, the UE stores the information of S-NSSAI and configured S-NSSAI of all PDU sessions.

At step 1007, the base station transmits an initial context setup response message or PDU session resource setup response message to the AMF, and the message may carry the configured S-NSSAI of the PDU session. If the configured S-NSSAI is carried in the message, the configured S-NSSAI can be carried in an update session management context request transmitted from the AMF to the SMF (at step 1008), and the SMF may reselect a UPF for the PDU session according to the configured S-NSSAI, and perform a UPF selection process (at step 1009).

At this point, the description of another embodiment of an exemplary PDU session setup method and an exemplary handover method of the present disclosure is completed. The method can avoid or reduce the problem of service interruption caused by a session handover failure when the UE moves or hands over between different base stations. At the same time, during UE's movement and handover, the network can always preferentially configure an ongoing session to the most suitable resources. When the most suitable resources are unavailable, it can do its best to serve the UE. And after multiple handovers, it can ensure that the most suitable resources are always configured for the PDU session of the UE.

Figure 11:
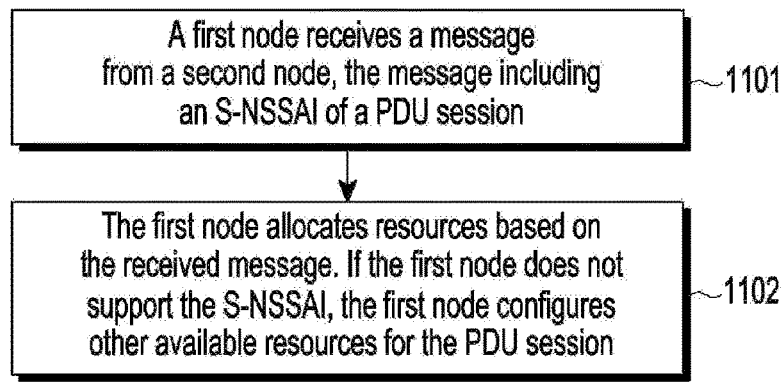
FIG. 11 illustrates yet another exemplary method for a PDU session setup and handover according to an embodiment of the present disclosure.

Another exemplary method of session setup and handover according to the present disclosure is illustrated in FIG. 11. A detailed description of steps unrelated to the present disclosure is omitted here. The method comprises the following steps.

At step 1101, a first node receives a message for requesting PDU session setup from a second node. The message includes the S-NSSAI of the PDU session to be configured.

The first node may be a base station or a core network node. The second node may be a core network node or a base station. The core network node may be a SMF or an AMF. By way of example, the message received by the first node from the second node may be transmitted from the core network node as the second node to the base station as the first node, from a first base station as the second node to a second base station as the first node (for example, from a source base station to a target base station), from a first core network node as the second node to a second core network node as the first node (for example, from a source core network node to a target core network node), or from the base station as the first node to the core network node as the second node. According to the specific implementations of the first node and the second node, the message may be, for example, an initial UE context setup request message (when the first node is a base station and the second node is a core network node), a PDU session resource setup request message (when the first node is a base station and the second node is a core network node), a handover request message (when the first node is a target base station and the second node is a core network node or the first node is a target base station and the second node is a source base station), a handover required message (when the first node is a source core network node and the second node is a source base station), a path switch request acknowledgement message (when the first node is a target base station and the second node is a core network node), or a create UE context request message (when the first node is a target core network node and the second node is a source core network node), etc. The above exemplifications are only examples, not limitations.

When the method is used for handover, the message for requesting PDU session setup also includes the S-NSSAI actually configured for the PDU session.

At step 1102, the first node receives a message for a session setup request. The first node stores the received PDU session information, including the S-NSSAI of the PDU session.

The first node considers the S-NSSAI in the message when allocating resources for the PDU session requested to be set up. When the first node or a cell of the first node does not support the S-NSSAI, the first node configures other available network slice resources for the PDU session. The first node selects appropriate network slice resources according to QoS parameters of QoS flow in the PDU session, network slices supported by a base station and/or the AMF and/or the SMF serving UE, and/or configuration of network operation and maintenance (O&M), etc.

The method may further comprise the following steps.

The first node transmits an actually configured S-NSSAI for the PDU session to the core network. According to the actually configured S-NSSAI for the UE, the core network may reselect the session management function entity and/or the user plane function entity of the PDU session for the UE. For example, the base station transmits the actually configured S-NSSAI for the PDU session to the AMF, and the AMF reselects the SMF and/or the UPF for the PDU session of the UE. Alternatively, the base station transmits the actually configured S-NSSAI for the PDU session to the SMF, and the SMF reselects the UPF for the PDU session of the UE.

When the method is used for handover, the second base station (the target base station) does not support the S-NSSAI of a PDU session, resources of another network slice are configured for the PDU session. When the second base station triggers the handover of the UE to the third base station, as described in step 1101, the message includes the S-NSSAI of the PDU session and the S-NSSAI actually configured for the PDU session. If the third base station supports the S-NSSAI of the PDU session, the third base station configures the PDU session on resources of the S-NSSAI of the PDU session. This method can ensure that the most suitable resources are always configured for the PDU session of the UE.

In a case where the method is only used for handover, when the source base station triggers handover of the UE to the target base station, the message as described in step 1101 is a handover request message, which may include the S-NSSAI of the PDU session; if the resources actually configured by the source base station for the PDU session are resources of the configured S-NSSAI for the PDU session, the handover request message may include the configured S-NSSAI. If the target base station supports the S-NSSAI of the PDU session, the PDU session is configured on resources of the S-NSSAI of the PDU session. If the target base station does not support the S-NSSAI of a PDU session or the S-NSSAI of the PDU session is overloaded or unavailable, it selects other network slice resources for the PDU session. This method can ensure that the most suitable resources are always configured for the PDU session of the UE. At this point, the description of another exemplary PDU session setup method and an exemplary handover method of the present disclosure is completed. The method can avoid or reduce the problem of service interruption caused by a session handover failure when the UE moves or hands over between different base stations. At the same time, during UE's movement and handover, the network can always preferentially configure an ongoing session to the most suitable resources. When the most suitable resources are unavailable, it can do its best to serve the UE. And after multiple handovers, it can ensure that the most suitable resources are always configured for the PDU session of the UE.

Figure 12:
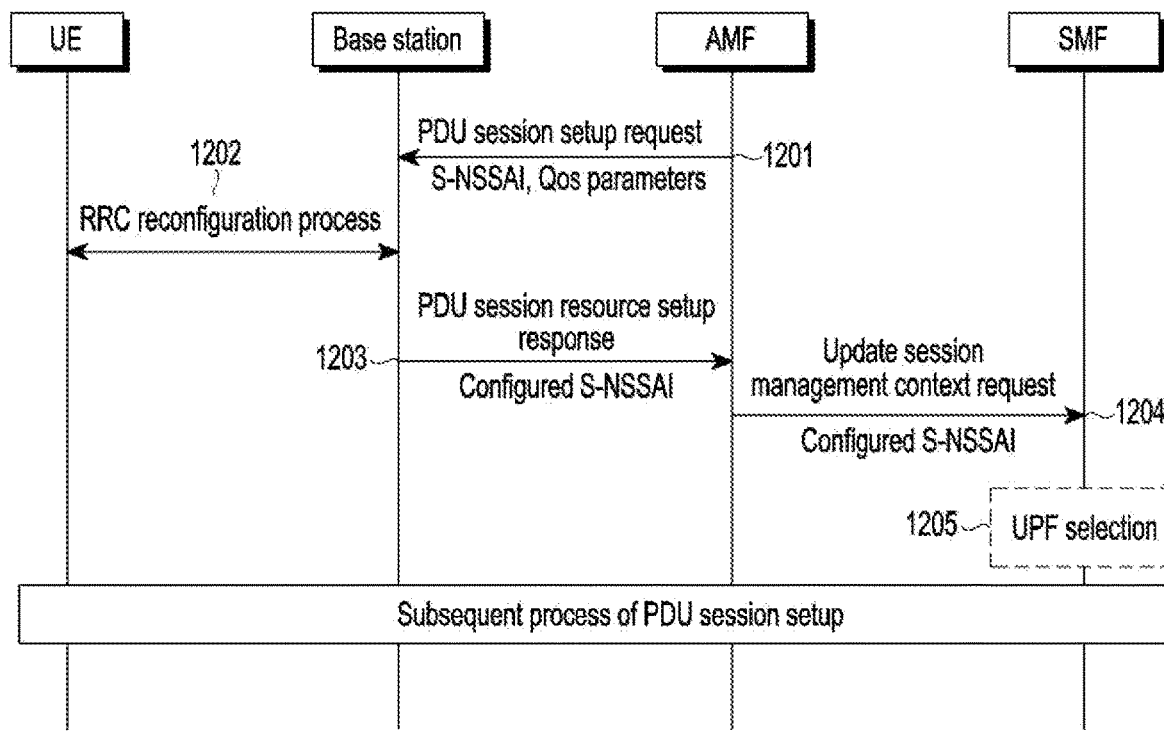
FIG. 12 illustrates one embodiment of the exemplary method illustrated in FIG. 11.

An embodiment of a method of session setup and handover of the present disclosure is illustrated in FIG. 12. A detailed description of steps unrelated to the present disclosure is omitted here. The following steps are included:

At step 1201, the AMF initiates an initial context setup request message or PDU session resource setup request message to the base station, and the message carries a S-NSSAI of a PDU session to be setup and QoS parameters of a QoS flow that is necessary to set up a PDU session.

It should be noted that there are two kinds of S-NSSAIs involved in the present disclosure, one is the S-NSSAI of the PDU session, the S-NSSAI of the PDU session being the S-NSSAI associated with a PDU session identifier contained in the N2 SM information transmitted from a core network to a base station during a PDU session setup process in the current 3GPP specification 23.502, or the S-NSSAI of the PDU session being the S-NSSAI associated with a PDU session identifier transmitted from a UE to a core network during the PDU session setup process in the current 3GPP specification 23.502; the second one is the S-NSSAI actually configured by the base station for the PDU session according to supported slice information, resource conditions and/or configuration of network operation and maintenance (O&M), etc., hereinafter referred to as configured S-NSSAI.

For the PDU session needed to be set up, the base station preferentially configures the resources of the S-NSSAI of the PDU session for the PDU session requested to be set up. If the base station does not support the S-NSSAI of the PDU session or the slice resources of the S-NSSAI of the PDU session are overloaded or unavailable, the base station may select a S-NSSAI serving the PDU session. The base station selects a S-NSSAI serving the PDU session according to QoS parameters of a QoS flow in the PDU session, S-NSSAI(s) supported by the base station and/or the AMF and/or the SMF serving UE, and/or configuration of network operation and maintenance (O&M), etc. The selected S-NSSAI is the configured S-NSSAI, which is a conditional information element, and is used only when the slice resources configured for PDU session are not the slice resources of the S-NSSAI of the PDU session, but the slice resources of the configured S-NSSAI.

The base station stores the information of S-NSSAI and the configured S-NSSAI of all PDU sessions.

At step 1202, the base station transmits a radio resource management (RRC) reconfiguration message to the UE. The message includes a NAS message of PDU session setup complete, which carries the S-NSSAI and the configured S-NSSAI of each PDU session. If the configured S-NSSAI appears, it means that the network slice resource used by the PDU session is not the slice resource corresponding to the S-NSSAI of the PDU session, but the slice resource corresponding to the configured S-NSSAI.

Upon receiving the message, the UE stores the information of S-NSSAI and the configured S-NSSAI of all PDU sessions.

At step 1203, the base station transmits an initial context setup response message or PDU session resource setup response message to the AMF, and the message may carry the configured S-NSSAI of the PDU session. If the configured S-NSSAI is carried in the message, the configured S-NSSAI can be carried in an update session management context request transmitted from the AMF to the SMF (at step 1204), and the SMF may reselect a UPF for the PDU session according to the configured S-NSSAI, and perform a UPF selection process (at step 1205). If the SMF does not receive the information of configured S-NSSAI in the message, the SMF knows that the corresponding PDU session uses slice resources of the S-NSSAI of the PDU session.

At this point, the description of an embodiment of an exemplary PDU session setup method and an exemplary handover method of the present disclosure is completed. The method can avoid or reduce the problem of service interruption caused by a session handover failure when the UE moves or hands over between different base stations. At the same time, during UE's movement and handover, the network can always preferentially configure an ongoing session to the most suitable resources. When the most suitable resources are unavailable, it can do its best to serve the UE. And after multiple handovers, it can ensure that the most suitable resources are always configured for the PDU session of the UE.

Figure 13:
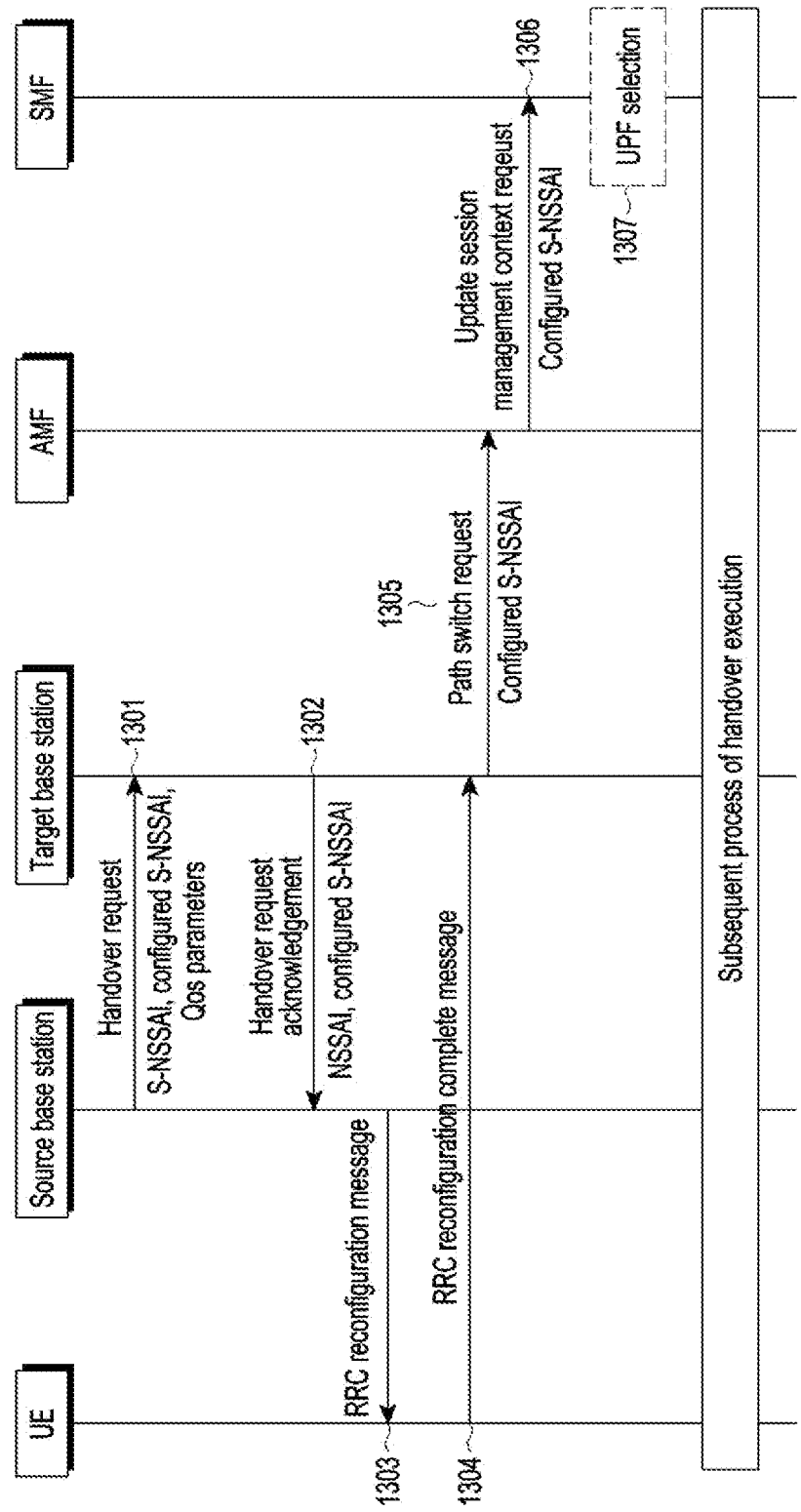
FIG. 13 illustrates another embodiment of the exemplary method illustrated in FIG. 11.

Another embodiment of a method of session setup and handover of the present disclosure is illustrated in FIG. 13. A detailed description of steps unrelated to the present disclosure is omitted here. The following steps are included:

At step 1301, a source base station transmits a handover request message to a target base station, where the message carries an S-NSSAI, configured S-NSSAI, and QoS parameters of a QoS flow, etc. of each PDU session requested. The configured S-NSSAI is a conditional information element, which will be used only when the slice resource actually used by the PDU session at the source base station is not the slice resource corresponding to the S-NSSAI of the PDU session, but the slice resource corresponding to the configured S-NSSAI.

The target base station preferentially configures the resources of the S-NSSAI of the PDU session for the PDU session requested to be set up. If the target base station does not support the S-NSSAI of the PDU session or the slice resources of the S-NSSAI are overloaded or unavailable, the target base station selects the network slice resources of appropriate S-NSSAI. The target base station can select network slice resources of appropriate S-NSSAI according to QoS parameters of QoS flows in PDU sessions, S-NSSAI(s) supported by the target base station and the target AMF, and/or configuration of network operation and maintenance (O&M), etc. After a successful selection, the newly selected S-NSSAI is indicated by the configured S-NSSAI.

If the target base station receives the configured S-NSSAI but it supports the S-NSSAI of the PDU session, the target base station selects back the slice resources of the S-NSSAI of the PDU session for the PDU session to ensure that the PDU session always uses the optimal slice resources supported by the network. After a successful selection, the target base station deletes the information of configured S-NSSAI in the PDU session context.

The target base station stores the network slice information actually configured for PDU session.

At step 1302, the target transmits a handover request acknowledgement message. The message includes a target to source transparent container.

At step 1303, if the slice resources of the PDU session are the resources of the configured S-NSSAI after the handover is completed, the source base station transmits a handover execution command to the UE through an RRC reconfiguration message, which carries the configured S-NSSAI of the PDU session. The UE stores the information of configured S-NSSAI of all PDU sessions. And if the UE does not receive the information of configured S-NSSAI in the message, the UE knows that the corresponding PDU session uses slice resources of the S-NSSAI of the PDU session.

At step 1304, the UE transmits an RRC reconfiguration complete message to the target base station to indicate that the handover is completed.

At step 1305, the target base station initiates a path switch request to the AMF, which carries the configured S-NSSAI of the PDU session.

At step 1306, the AMF transmits the configured S-NSSAI of the PDU session to the SMF through an update session management context request message. If the SMF does not receive the information of configured S-NSSAI in the message, the SMF knows that the corresponding PDU session uses slice resources of the S-NSSAI of the PDU session.

The slice resources actually used by the PDU session may change, for example, the slice resources actually used by the PDU session change from the resources of the S-NSSAI of the PDU session to the resources of the configured S-NSSAI, or from the resources of the configured S-NSSAI to the resources of the S-NSSAI of the PDU session. At step 1307, the SMF may reselect the UPF for the PDU session and perform a UPF selection process according to the changed S-NSSAI information.

At this point, the description of another embodiment of an exemplary PDU session setup method and an exemplary handover method of the present disclosure is completed. The method can avoid or reduce the problem of service interruption caused by a session handover failure when the UE moves or hands over between different base stations. At the same time, during UE's movement and handover, the network can always preferentially configure an ongoing session to the most suitable resources. When the most suitable resources are unavailable, it can do its best to serve the UE. And after multiple handovers, it can ensure that the most suitable resources are always configured for the PDU session of the UE.

Figure 14:
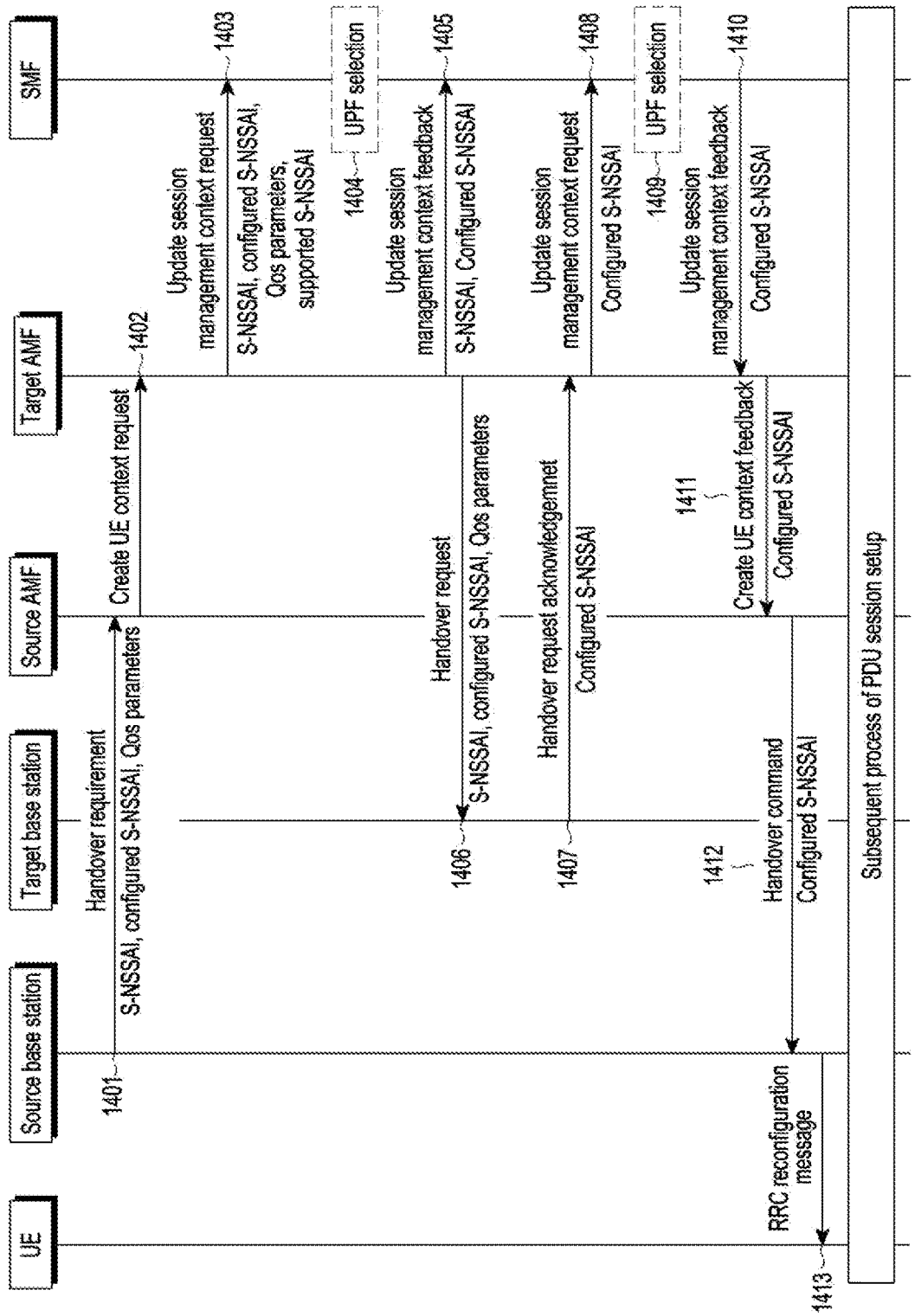
FIG. 14 illustrates yet another embodiment of the exemplary method illustrated in FIG. 11.

Yet another embodiment of a method of session setup and handover of the present disclosure is illustrated in FIG. 14. A detailed description of steps unrelated to the present disclosure is omitted here. The following steps are included:

At step 1401, a source base station initiates a handover required message to a source AMF. The message carries an S-NSSAI, a configured S-NSSAI, QoS parameters of QoS flows, etc., of each PDU session. The configured S-NSSAI is a conditional information element, which appears only when the slice resource actually used by the PDU session at the source base station is not the resource corresponding to the S-NSSAI of the PDU session, but the configured S-NSSAI.

At step 1402, the source AMF transmits a create UE context request message to a target AMF, the message including a handover required transfer container from the source base station. The message includes a SM N2 information list, a PDU session identification list and UE context information. The UE context information includes a PDU session identification list, SMF information corresponding to a PDU session, S-NSSAI for the PDU session, and configured S-NSSAI for the PDU session.

At step 1403, the target AMF transmits an update session management context request message to the SMF, which includes the S-NSSAI, the configured S-NSSAI and/or the QoS parameters of QoS flows of each PDU session requested to be set up during handover, and the supported S-NSSAI by the target network. The target network includes a target core network and a target base station.

The SMF preferentially configures the resources of the S-NSSAI of the PDU session for the PDU session requested to be set up. If the target network does not support the S-NSSAI of the PDU session or the slice resources of the S-NSSAI are overloaded or unavailable, the SMF can reselect the network slice resources of appropriate S-NSSAI according to the QoS parameters of QoS flows in the PDU session, network slices supported by the base station and/or the AMF and/or the SMF serving UE, and/or configuration of network operation and maintenance (O&M), etc. After a successful selection, the newly selected S-NSSAI is indicated by the configured S-NSSAI. The target network is a target core network and a target base station.

If the SMF receives the configured S-NSSAI but the target network supports the S-NSSAI of the PDU session, the SMF selects back the slice resources of the S-NSSAI of the PDU session for the PDU session to ensure that the PDU session always uses the optimal slice resources supported by the network. After a successful selection, the SMF deletes the information of configured S-NSSAI in the PDU session context.

The SMF stores the network slice information actually configured for PDU session.

At step 1404, because the slice resources actually used by the PDU session may change, for example, the slice resources actually used by the PDU session change from the resources of the S-NSSAI of the PDU session to the resources of the configured S-NSSAI, or from the resources of the configured S-NSSAI to the resources of the S-NSSAI, the SMF may reselect the UPF for the PDU session according to the changed S-NSSAI information, and perform a UPF selection process.

At step 1405, the SMF transmits an update session management context response message to the target AMF, the message carrying updated S-NSSAI and \configured S-NSSAI of each PDU session.

At step 1406, the target AMF transmits a handover request message to a target base station, the message carrying an S-NSSAI, a configured S-NSSAI, and QoS parameters of each PDU session requested to be set up. The configured S-NSSAI is a conditional information element, which appears only when the slice resource actually used by the PDU session at the source base station is the resource corresponding to a configured S-NSSAI.

The target base station preferentially configures the resources of the S-NSSAI of the PDU session for the PDU session requested to be set up. If the target base station does not support the S-NSSAI of the PDU session or the slice resources of the S-NSSAI are overloaded or unavailable, the target base station can select the network slice resources of appropriate S-NSSAI according to the QoS parameters of QoS flows in the PDU session, S-NSSAI(s) supported by the target base station and the target AMF, and/or configuration of network operation and maintenance (O&M), etc. After a successful selection, the newly selected S-NSSAI is indicated by the configured S-NSSAI.

If the target base station receives the configured S-NSSAI but it supports the S-NSSAI of the PDU session, the target base station selects back the slice resources of the S-NSSAI of the PDU session for the PDU session to ensure that the PDU session always uses the optimal slice resources supported by the network. After a successful selection, the target base station deletes the information of configured S-NSSAI in the PDU session context.

The target base station stores the network slice information actually configured for PDU session.

At step 1407, the target base station transmits a handover request acknowledgement message to the target AMF, if the network slice resources serving the PDU session are the slice resources of the configured S-NSSAI, the message carries information of the configured S-NSSAI of the PDU session.

At step 1408, the AMF transmits the configured S-NSSAI of the PDU session to the SMF through an update session management context request message. If the SMF does not receive the information of configured S-NSSAI in the message, the SMF knows that the corresponding PDU session uses slice resources of the S-NSSAI of the PDU session. At step 1409, because the slice resources actually used by the PDU session may change, for example, the slice resources actually used by the PDU session change from the resources of the S-NSSAI of the PDU session to the resources of the configured S-NSSAI, or from the resources of the configured S-NSSAI to the resources of the S-NSSAI of the PDU session, the SMF may reselect the UPF for the PDU session according to the changed S-NSSAI information, and perform a UPF selection process.

At step 1410, the SMF transmits an update session management context response information to the target AMF.

At step 1411, if the actually configured network slice resources to PDU session are the resources of the configured S-NSSAI, the target AMF can inform the source AMF of this through a create UE context response message, the source AMF can inform the source base station of this through a handover command message (step 1412), and then the source base station informs the UE of this through an RRC reconfiguration message (step 1413), wherein, the messages all carry the configured S-NSSAI to PDU session successfully set up after handover.

The UE stores the information of configured S-NSSAI of all PDU sessions.

And if the UE does not receive the information of configured S-NSSAI in the message, the UE knows that the corresponding PDU session uses slice resources of the S-NSSAI of the PDU session.

At this point, the description of yet another embodiment of an exemplary PDU session setup method and an exemplary handover method of the present disclosure is completed. The method can avoid or reduce the problem of service interruption caused by a session handover failure when the UE moves or hands over between different base stations. At the same time, during UE's movement and handover, the network can always preferentially configure an ongoing session to the most suitable resources. When the most suitable resources are unavailable, it can do its best to serve the UE. And after multiple handovers, it can ensure that the most suitable resources are always configured for the PDU session of the UE.

Figure 15:
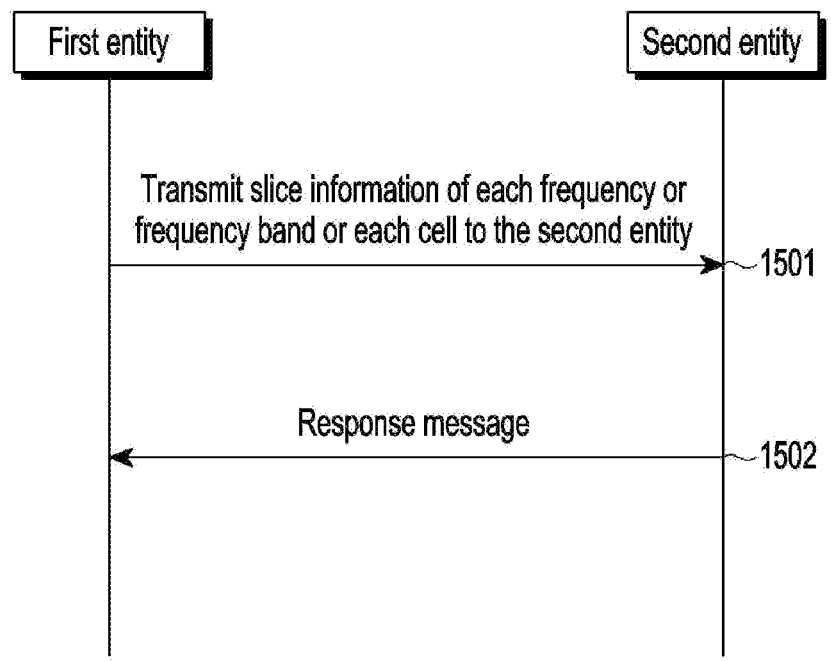
FIG. 15 illustrates another exemplary method for a PDU session setup and handover according to an embodiment of the present disclosure.

FIG. 15 illustrates another exemplary method for a PDU session setup and handover according to an embodiment of the present disclosure. The following steps are included:

At step 1501, a first entity transmits one or more slice information of each frequency or frequency band it supports to a second entity. The first entity may also transmits one or more slice information of a cell it serves to the second entity. The first entity may also transmit one or more slice information of each frequency or frequency band of the cell it serves to the second entity.

The first entity may be a base station or a base station distribution unit (gNB-DU).

The slice information may be S-NSSAI.

The first entity may transmit the information to the second entity through an Xn setup request, an X2 setup request, a base station configuration update request or a F1 setup request message.

According to the received network slice information, the second entity knows the network slices supported by the cell or frequency or frequency band of the first entity, so that it can determine whether to allocate resources for the UE to the first entity, for example, by handing over the UE to the first entity or configuring the first entity as a secondary base station serving the UE or configuring the UE to a cell on the first entity.

At step 1502, the second entity transmits a response message to the first entity.

The second entity can transmit one or more slice information of each frequency or frequency band it supports to the first entity through the response message. The second entity may also transmits one or more slice information of a cell it serves to the first entity. The second entity may also transmit one or more slice information of each frequency or frequency band of the cell it serves to the first entity.

The second entity may be another base station or a base station central unit (gNB-CU).

The slice information may be S-NSSAI.

The response message may be an Xn setup response, an X2 setup response, a base station configuration update acknowledgement or an F1 setup response message.

According to the received network slice information, the first entity knows the network slices supported by the cell or frequency or frequency band of the second entity, so that it can decide whether to allocate resources for the UE to the second entity, for example, by handing over the UE to the second entity or configuring the second entity as a secondary base station serving the UE.

At this point, the description of another exemplary method for PDU session setup and handover according to the present disclosure has been completed. The method can know the network slices supported by each frequency or frequency band or each cell of a neighbor base station or a gNB-DU, thereby better configuring appropriate resources for UE, avoiding resource configuration or handover failure, and avoiding or reducing the problem of service interruption caused by a session handover failure when the UE moves or hands over between different base stations. At the same time, during UE's movement and handover, the network can always preferentially configure an ongoing session to the most suitable resources.

At this point, the description of a PDU session setup method and a handover method of the present disclosure is completed. The method can avoid or reduce the problem of service interruption caused by a session handover failure when the UE moves or hands over between different base stations. At the same time, during UE's movement and handover, the network can always preferentially configure an ongoing session to the most suitable resources. When the most suitable resources are unavailable, it can do its best to serve the UE. And after multiple handovers, it can ensure that the most suitable resources are always configured for the PDU session of the UE.

According to various embodiments, a first node may include a transmitter, a controller, a receiver, and a storage unit. Here, the transmitter and the receiver may be implemented as a transceiver. The controller controls the overall operation of the first node. More particularly, the controller controls the first node to perform various operations as described with reference to FIGS. 1 to 15, and a description thereof will be omitted herein. The transmitter transmits various signals, various messages, and the like to another entity, e.g., a second node under a control of the controller. The various signals, the various messages, and the like transmitted in the transmitter have been described in FIGS. 1 to 15, and a description thereof will be omitted herein. The receiver receives various signals, various messages, and the like from another entity, e.g., the second node, and the like under a control of the controller. The various signals, the various messages and the like received in the receiver have been described in FIGS. 1 to 15, and a description thereof will be omitted herein. The storage unit stores a program and various data necessary for the operation of the first node. The storage unit stores the various signals, the various messages, and the like received in the receiver. While the transmitter, the controller, the receiver, and the storage unit are described as separate processors, it is to be understood that this is merely for convenience of description. In other words, two or more of the transmitter, the controller, the receiver, and the storage unit may be incorporated into a single processor.

According to various embodiments, a second node may include a transmitter, a controller, a receiver, and a storage unit. Here, the transmitter and the receiver may be implemented as a transceiver. The controller controls the overall operation of the second node. More particularly, the controller controls the second node to perform various operations as described with reference to FIGS. 1 to 15, and a description thereof will be omitted herein. The transmitter transmits various signals, various messages, and the like to another entity, e.g., a first node under a control of the controller. The various signals, the various messages, and the like transmitted in the transmitter have been described in FIGS. 1 to 15, and a description thereof will be omitted herein. The receiver receives various signals, various messages, and the like from another entity, e.g., the first node, and the like under a control of the controller. The various signals, the various messages and the like received in the receiver have been described in FIGS. 1 to 15, and a description thereof will be omitted herein. The storage unit stores a program and various data necessary for the operation of the second node. The storage unit stores the various signals, the various messages, and the like received in the receiver. While the transmitter, the controller, the receiver, and the storage unit are described as separate processors, it is to be understood that this is merely for convenience of description. In other words, two or more of the transmitter, the controller, the receiver, and the storage unit may be incorporated into a single processor.

According to various embodiments, a UE may include a transmitter, a controller, a receiver, and a storage unit. Here, the transmitter and the receiver may be implemented as a transceiver. The controller controls the overall operation of the UE. More particularly, the controller controls the UE to perform various operations as described with reference to FIGS. 1 to 15, and a description thereof will be omitted herein. The transmitter transmits various signals, various messages, and the like to another entity, e.g., a BS under a control of the controller. The various signals, the various messages, and the like transmitted in the transmitter have been described in FIGS. 1 to 15, and a description thereof will be omitted herein. The receiver receives various signals, various messages, and the like from another entity, e.g., the BS, and the like under a control of the controller. The various signals, the various messages and the like received in the receiver have been described in FIGS. 1 to 15, and a description thereof will be omitted herein. The storage unit stores a program and various data necessary for the operation of the UE. The storage unit stores the various signals, the various messages, and the like received in the receiver. While the transmitter, the controller, the receiver, and the storage unit are described as separate processors, it is to be understood that this is merely for convenience of description. In other words, two or more of the transmitter, the controller, the receiver, and the storage unit may be incorporated into a single processor.

According to various embodiments, a BS may include a transmitter, a controller, a receiver, and a storage unit. Here, the transmitter and the receiver may be implemented as a transceiver. The controller controls the overall operation of the BS. More particularly, the controller controls the BS to perform various operations as described with reference to FIGS. 1 to 15, and a description thereof will be omitted herein. The transmitter transmits various signals, various messages, and the like to another entity, e.g., a UE under a control of the controller. The various signals, the various messages, and the like transmitted in the transmitter have been described in FIGS. 1 to 15, and a description thereof will be omitted herein. The receiver receives various signals, various messages, and the like from another entity, e.g., the UE, and the like under a control of the controller. The various signals, the various messages and the like received in the receiver have been described in FIGS. 1 to 15, and a description thereof will be omitted herein. The storage unit stores a program and various data necessary for the operation of the BS. The storage unit stores the various signals, the various messages, and the like received in the receiver. While the transmitter, the controller, the receiver, and the storage unit are described as separate processors, it is to be understood that this is merely for convenience of description. In other words, two or more of the transmitter, the controller, the receiver, and the storage unit may be incorporated into a single processor.

According to an aspect of the present disclosure, a method and apparatus for session setup and handover in a wireless communication system are provided. The method comprises: receiving, by the first node, a message from a second node, the message comprising a Single Network Slice Selection Assistance Information S-NSSAI of a PDU session; and allocating, by the first node, the resources for the PDU session based on the message received from the second node, wherein, when the first node supports the S-NSSAI of the PDU session, it allocates resources of the S-NSSAI of the PDU session for the PDU session, while when the first node does not support the S-NSSAI or the resources of the S-NSSAI are unavailable or overloaded, the first node allocates other available resources for the PDU session.

According to another aspect of the present disclosure, a base station in a wireless communication system comprises: a transceiver configured to receive or transmit signals; and at least one processor configured to receive a message from a second node, the message comprising a Single Network Slice Selection Assistance Information (S-NSSAI) of a PDU session; and allocate the resources for the PDU session based on the message received from the second node, wherein, when the base station supports the S-NSSAI of the PDU session, it allocates resources of the S-NSSAI of the PDU session for the PDU session, while when the base station does not support the S-NSSAI or the resources of the S-NSSAI are unavailable or overloaded, the base station allocates other available resources for the PDU session.

According to another aspect of the present disclosure, a core network node in a wireless communication system comprises: a transceiver configured to receive or transmit signals; and at least one processor configured to receive a message from a second node, the message comprising an initially allocated Single Network Slice Selection Assistance Information (S-NSSAI) of a PDU session; and allocate the resources for the PDU session based at least in part on the message received from the second node, wherein, when the core network node supports the S-NSSAI of the PDU session, it allocates network slice resources of the S-NSSAI of the PDU session for the PDU session, while when the core network node does not support the S-NSSAI or the network slice resources of the S-NSSAI are unavailable or overloaded, the core network node allocates other available network slice resources for the PDU session.

In an embodiment, the message received by the first node from the second node comprises at least one of an initial UE context setup request message received by a base station from a core network node, a PDU session resource setup request message received by the base station from the core network node, a handover request message received by a target base station from a core network node, a path switch request acknowledgement message received by the target base station from the core network node, a handover request message received by a target base station from the source base station, a handover required message received by a source core network node from the source base station, and a create UE context request message received by a target core network node from the source core network node.

In an embodiment, the first node further allocates other available network slice resources for the PDU session based on QoS parameters of QoS flows in the PDU session, network slice resources supported by a base station serving the UE, and/or an configuration of network operation and maintenance O&M.

In an embodiment, the first node is a base station or a core network node, and the second node is a core network node or a base station.

In an embodiment, the core network node comprises a session management function entity SMF or an access control and mobility management function entity AMF.

In one embodiment, the message received by the first node from the second node comprises a network slice policy information, and the first node allocates the other available resources for the PDU session based on the network slice policy information. In an embodiment, the network slice policy information comprises one or more assisting S-NSSAI(s).

In an embodiment, the network slice policy information comprises a plurality of assisting S-NSSAIs with different priorities, and the first node prioritizes the resources of an assisting S-NSSAI with a high priority when allocating resources.

In an embodiment, the network slice policy information is generated or updated by the AMF or the SMF.

In an embodiment, the network slice policy information is based on a network slice policy information received from a user equipment UE.

In an embodiment, the network slice policy information is generated or updated based on a network slice selection policy NSSP, subscription information of a UE, quality of service Qos information of a service, and S-NSSAI(s) supported by a base station serving UE.

In an embodiment, the actually configured S-NSSAI corresponding to the other available resources is transmitted to a core network node.

In an embodiment, the SMF and/or a user plane function entity UPF for the PDU session of the UE are reselected according to the actually configured S-NSSAI.

In an embodiment, when a plurality of SMFs support the S-NSSAI of the PDU session, the SMF supporting the most number of assisting S-NSSAIs in the network slice policy information is selected among the plurality of SMFs.

In an embodiment, if a SMF does not support the assisting S-NSSAIs in the received network slice policy information, the network slice policy information is updated to ensure that the S-NSSAIs in the network slice policy information are all supported by the SMF.

In an embodiment, when the method is used for handover, the actually configured S-NSSAI corresponding to the other available resources is included in the message received at the first node from the second node.

In an embodiment, when the method is used for the handover, if the first node supports the S-NSSAI of the PDU session, it selects resources of the S-NSSAI of the PDU session for the PDU session and deletes the actually configured S-NSSAI in the PDU session context.

The methods stated in the claims and/or the specification according to various embodiments may be implemented by hardware, software or a combination of hardware and software.

When the method is implemented by software, a computer-readable storage medium for storing one or more programs (software modules) may be provided. The one or more programs stored in the computer-readable storage medium may be configured to be executed by one or more processors within an electronic device. At least one program may include instructions that cause an electronic device to perform a method according to various embodiments of the present disclosure as defined by the appended claims and/or disclosed herein.

The programs (software modules or software) can be stored in a nonvolatile memory, including a random access memory (RAM) and a flash memory, a read-only memory (ROM), an electrically erasable programmable ROM (EEPROM), a magnetic disk storage device, a compact disk-ROM (CD-ROM), a digital versatile disk (DVD) or other types of an optical storage device or a magnetic tape cassette. Alternatively, any combination of some or all of them may form a memory storing programs. Furthermore, a plurality of such memories may be included in the electronic device.

In addition, the programs can be stored in an attachable storage device that can access the electronic device through a communication network such as the Internet, an intranet, a local area network (LAN), a wide LAN (WLAN), and a storage area network (SAN) or a combination thereof. Such a storage device can access the electronic device executing various embodiments of the present disclosure via an external port. In addition, a separate storage device on the communication network can access the portable electronic device.

In the above detailed various embodiments of the disclosure, according to the presented detailed embodiments, the components included in the disclosure are expressed in singular or plural. However, the singular form or the plural form is selected for convenience of description, which is suitable for the presented situation, and various embodiments of the present disclosure are not limited to a single element or multiple elements thereof. In addition, a plurality of elements expressed in the description may be configured into a single element, or a single element in the description may be configured into a plurality of elements.

Although the present disclosure has been shown and described with reference to various embodiments of the present disclosure, it will be understood by those skilled in the art that various changes in form and details may be made without departing from the spirit and scope of the disclosure as defined by the appended claims and their equivalent.

The invention claimed is:

1. A method performed by a first base station in a wireless communication system, the method comprising:
   receiving, from a second base station, a first message comprising at least one first single network slice selection assistance information (S-NSSAI) associated with a protocol data unit (PDU) session and at least one second S-NSSAI related to a resource re-selection for the PDU session; and
   based on a resource related to the at least one first S-NSSAI being overloaded, allocating a resource for the PDU session based on the at least one second S-NSSAI.

2. The method of claim 1, wherein the resource for the PDU session is allocated based on at least one of quality of service (QOS) parameters of QoS flows in the PDU session, network slice resources supported by a base station serving a user equipment (UE), or configuration of network operation and maintenance.

3. The method of claim 1, wherein the first message comprises network slice policy information, and
   wherein the network slice policy information comprises one or more assisting S-NSSAI.

4. The method of claim 1, wherein the at least one second S-NSSAI comprises a plurality of assisting S-NSSAI with different priorities, and
   wherein resources related to an assisting S-NSSAI with a specific priority among the plurality of assisting S-NSSAI are prioritized.

5. The method of claim 3, wherein the network slice policy information is generated or updated by an access control and mobility management function (AMF) entity or a session management function (SMF) entity.

6. The method of claim 3, wherein the network slice policy information is based on a network slice policy information received from a user equipment (UE).

7. The method of claim 3, wherein the network slice policy information is generated or updated based on a network slice selection policy (NSSP), subscription information of a user equipment (UE), quality of service (QOS) information of a service, and S-NSSAI supported by a base station serving the UE.

8. A first base station in a wireless communication system, the first base station comprising:
   a transceiver; and
   a controller connected with the transceiver, wherein the controller is configured to:
      receive, from a second base station via the transceiver, a first message comprising at least one first single network slice selection assistance information (S-NSSAI) associated with a protocol data unit (PDU) session and at least one second S-NSSAI related to a resource re-selection for the PDU session, and
      based on a resource related to the at least one first S-NSSAI being overloaded, allocate a resource for the PDU session based on the at least one second S-NSSAI.

9. The first base station of claim 8, wherein the resource for the PDU session is allocated based on at least one of quality of service (QOS) parameters of QoS flows in the PDU session, network slice resources supported by a base station serving a user equipment (UE), or configuration of network operation and maintenance.

10. The first base station of claim 8, wherein the first message comprises network slice policy information, and
    wherein the network slice policy information comprises one or more assisting S-NSSAI.

11. The first base station of claim 8, wherein the at least one second S-NSSAI comprises a plurality of assisting S-NSSAI with different priorities, and
    wherein resources related to an assisting S-NSSAI with a specific priority among the plurality of assisting S-NSSAI are prioritized.

12. The first base station of claim 10, wherein the network slice policy information is generated or updated by an access control and mobility management function (AMF) entity or a session management function (SMF) entity.

13. The first base station of claim 10, wherein the network slice policy information is based on a network slice policy information received from a user equipment (UE).

14. The method of claim 1, further comprising:
    in response to the first message, transmitting a second message to the second base station, wherein the second message includes information related to at least one other S-NSSAI associated with the PDU session.

15. The method of claim 14, further comprising:
transmitting, to an access and mobility management function (AMF), a third message including the information related to the at least one other S-NSSAI associated with the PDU session.

16. The first base station of claim 8, wherein the controller is further configured to:
in response to the first message, transmit a second message to the second base station via the transceiver, and
wherein the second message includes information related to at least one other S-NSSAI associated with the PDU session.

17. The first base station of claim 16, wherein the controller is further configured to:
transmit, to an access and mobility management function (AMF) via the transceiver, a third message including the information related to the at least one other S-NSSAI associated with the PDU session.

18. The method of claim 14, wherein the second message is an acknowledgement message for a handover request.

19. The method of claim 1, wherein the first message is a message for a handover request.

* * * * *